(12) United States Patent
Robertson

(10) Patent No.: US 12,355,656 B2
(45) Date of Patent: Jul. 8, 2025

(54) METHODS, SYSTEMS, AND APPARATUS FOR ROUTING DATA IN A SELF-HEALING NETWORK AND FOR SELF-HEALING OF A NETWORK

(71) Applicant: Crius Technology Group, LLC, Austin, TX (US)

(72) Inventor: Glenn John Robertson, Buda, TX (US)

(73) Assignee: Crius Technology Group, Inc., Austin, TX (US)

( * ) Notice: Subject to any disclaimer, the term of this patent is extended or adjusted under 35 U.S.C. 154(b) by 255 days.

(21) Appl. No.: 17/484,952

(22) Filed: Sep. 24, 2021

(65) Prior Publication Data

US 2023/0093883 A1 Mar. 30, 2023

(51) Int. Cl.
*H04L 45/12* (2022.01)
*H04L 43/0817* (2022.01)
*H04L 43/50* (2022.01)
*H04L 45/02* (2022.01)
*H04L 45/42* (2022.01)
*H04L 69/18* (2022.01)

(52) U.S. Cl.
CPC ........ *H04L 45/123* (2013.01); *H04L 43/0817* (2013.01); *H04L 43/50* (2013.01); *H04L 45/02* (2013.01); *H04L 45/42* (2013.01); *H04L 69/18* (2013.01)

(58) Field of Classification Search
CPC ... H04L 45/123; H04L 43/0817; H04L 43/50; H04L 45/02; H04L 45/42; H04L 69/18
See application file for complete search history.

(56) References Cited

U.S. PATENT DOCUMENTS

| | | | |
|---|---|---|---|
| 3,735,329 A | 5/1973 | Funabashi et al. | |
| 7,577,188 B1 | 8/2009 | Lewis | |
| 7,853,809 B2 | 12/2010 | Zhang et al. | |
| 8,341,289 B2 | 12/2012 | Hellhake et al. | |
| 9,793,952 B1 | 10/2017 | Bogdanovich | |
| 10,432,257 B2 | 10/2019 | Bogdanovich | |
| 10,483,469 B2 | 11/2019 | Bogdanovich | |
| 10,879,956 B2 | 12/2020 | Bogdanovich | |
| 2004/0252643 A1 | 12/2004 | Joshi | |
| 2005/0275532 A1 | 12/2005 | Ferri et al. | |
| 2008/0181133 A1* | 7/2008 | Thubert | H04W 40/30 370/255 |
| 2010/0130142 A1 | 5/2010 | Schubert | |
| 2011/0320434 A1 | 12/2011 | Carston et al. | |
| 2012/0173900 A1 | 7/2012 | Diab et al. | |
| 2013/0057158 A1 | 3/2013 | Josefowicz et al. | |
| 2013/0275174 A1 | 10/2013 | Bennett et al. | |
| 2014/0040160 A1 | 2/2014 | Comito | |
| 2014/0058577 A1 | 2/2014 | Erhart et al. | |
| 2014/0175875 A1 | 6/2014 | Newman, Jr. et al. | |
| 2014/0213191 A1* | 7/2014 | Courtice | H04L 45/125 455/67.11 |

(Continued)

FOREIGN PATENT DOCUMENTS

WO WO-2013070265 A1 * 5/2013 ............. H04L 43/08

*Primary Examiner* — Huy D Vu
*Assistant Examiner* — Robert Ma
(74) *Attorney, Agent, or Firm* — Pierson Ferdinand, LLP; Jeffrey R. Ambroziak

(57) ABSTRACT

Methods, apparatus and techniques for routing data through a mesh network and for self-healing of the mesh network.

11 Claims, 18 Drawing Sheets

(56) References Cited

U.S. PATENT DOCUMENTS

| | | | |
|---|---|---|---|
| 2016/0219414 A1* | 7/2016 | Purohit | H04W 4/06 |
| 2018/0123957 A1* | 5/2018 | Chen | H04L 45/26 |
| 2018/0295529 A1* | 10/2018 | Jen | H04W 24/04 |
| 2018/0375026 A1 | 12/2018 | Bogdanovich | |
| 2019/0013470 A1 | 1/2019 | Bogdanovich | |
| 2020/0028538 A1 | 1/2020 | Bogdanovich | |
| 2020/0106479 A1 | 4/2020 | Bogdanovich | |
| 2021/0119668 A1 | 4/2021 | Bogdanovich | |

* cited by examiner

METHODS, SYSTEMS, AND APPARATUS FOR ROUTING DATA IN A SELF-HEALING NETWORK AND FOR SELF-HEALING OF A NETWORK

FIELD OF THE INVENTION

The present application relates to networking technologies, autonomous network healing technologies, communication cube technologies, and, more particularly, to a system and method for facilitating self-healing of a network through the use of self-healing algorithms and mesh-networked communication cubes.

BACKGROUND

In today's society, network reliability and stability has become increasingly important. For example, such network reliability and stability are especially important in the context of preventing disruption to communications, disruption relating to the transfer of digital content, and preventing disruption to business and/or military operations. Currently existing technologies often require human intervention or resending of communications to ensure that communications are effectively sent to a destination in the event of a network disruption. As a result, there remains room for substantial enhancements to existing technologies and processes and for the development of new technologies and processes to facilitate healing of a network. While currently existing technologies provide for various benefits, such technologies still come with various drawbacks and inefficiencies. For example, currently existing processes and technologies often do not autonomously repair and/or heal a network. Additionally, while currently existing processes may have short-term effectiveness on a case-by-case basis, existing processes often fail to have lasting long-term reliability, scalability, and/or effectiveness for networks. Based on the foregoing, current technologies may be improved and enhanced so as to provide for more effective network self-healing capabilities, increased autonomy, reduced resending of communications, enhanced reliability, enhanced scalability, reduced network usage, and increased stability. Such enhancements and improvements to methodologies and technologies may provide for enhanced communication and network monitoring capabilities.

SUMMARY

A system and accompanying methods for facilitating self-healing of a network through the use of self-healing algorithms are disclosed.

In one embodiment, a system for facilitating self-healing of a network is provided. The system may include a memory that stores instructions and a processor that executes the instructions to perform various operations of the system. The system may perform an operation that includes monitoring a mesh network comprising the node and a plurality of other nodes to detect a plurality of communication links that the node has with other nodes of the network, determining at least one performance parameter of each communication link, creating an electronic table of the detected links in which the detected links are ranked as a function of the at least one performance parameter, receiving data via the network, the data indicating a destination node for the data, selecting the highest ranked communication link in the table subject to any other overriding criterion for forwarding the received data toward the destination node, determining whether the selected communication link is operable, (h) if the selected communication link is determined to be operable, transmitting the data via the selected link, and, if the selected link is not determined to be operable, updating the table and transmitting the data via a different link.

In another embodiment, a method for facilitating self-healing of a network is disclosed. The method may include a memory that stores instructions and a processor that executes the instructions to perform the functionality of the method. In particular, the method may include monitoring a mesh network comprising the node and a plurality of other nodes to detect a plurality of communication links that the node has with other nodes of the network, determining at least one performance parameter of each communication link, creating an electronic table of the detected links in which the detected links are ranked as a function of the at least one performance parameter, receiving data via the network, the data indicating a destination node for the data, selecting the highest ranked communication link in the table subject to any other overriding criterion for forwarding the data toward the destination node, determining whether the selected communication link is operable, (h) if the selected communication link is determined to be operable, transmitting the data via the selected link, and, if the selected link is not determined to be operable, updating the table and transmitting the data via a different link.

According to yet another embodiment, a computer-readable device comprising instructions, which, when loaded and executed by a processor cause the processor to perform operations, the operations comprising monitoring a mesh network comprising the node and a plurality of other nodes to detect a plurality of communication links that the node has with other nodes of the network, determining at least one performance parameter of each communication link, creating an electronic table of the detected links in which the detected links are ranked as a function of the at least one performance parameter, receiving data via the network, the data indicating a destination node for the data, selecting the highest ranked communication link in the table subject to any other overriding criterion for forwarding the received data toward the destination node, determining whether the selected communication link is operable, if the selected communication link is determined to be operable, transmitting the data via the selected link, and, if the selected link is not determined to be operable, updating the table and transmitting the data via a different link.

These and other features of the systems and methods for facilitating self-healing of a network are described in the following detailed description, drawings, and appended claims.

DETAILED DESCRIPTION OF THE DRAWINGS

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

U.S. Published Patent Application No. 2023/051350 (patent application Ser. No. 17/398,224, entitled METHODS AND APPARATUS FOR MULTI-PATH MESH NETWORK ENCRYPTION AND KEY GENERATION) filed Aug. 10, 2021, and co-owned with the present application is incorporated herein by reference in its entirety.

With the growth of the Internet of Things, existing devices are becoming networked in order to enable the monitoring, controlling, and communicating of the devices. Lighting and lighting systems are devices that are becoming networked in order to control power, color, and brightness. Currently, the method for incorporating a control system into an existing lighting system may be carried out by running wire or cable from a control device/panel to the lighting system. The running of the wire or cable may cost $10,000 per floor and may require days to accomplish. Additionally, the control device/panel may cost between $10,000 to $15,000. With such economics, the implementation of the Internet of Things to existing lighting systems has been slow in coming.

A method, apparatus, and system for monitoring, controlling, and communicating of devices may be described. The method, apparatus, and system may use a radio communication to power line communication bridge and networking system for the monitoring, controlling, and communicating of devices such as lighting systems. This method, apparatus, and system may not require the running of wire or cable and may be deployed in hours, not days, at a fraction of the cost of existing control systems. Since the apparatus may be used with any lighting fixture or lamp brand, the apparatus may be integrated into any existing lighting system.

Figure 1:
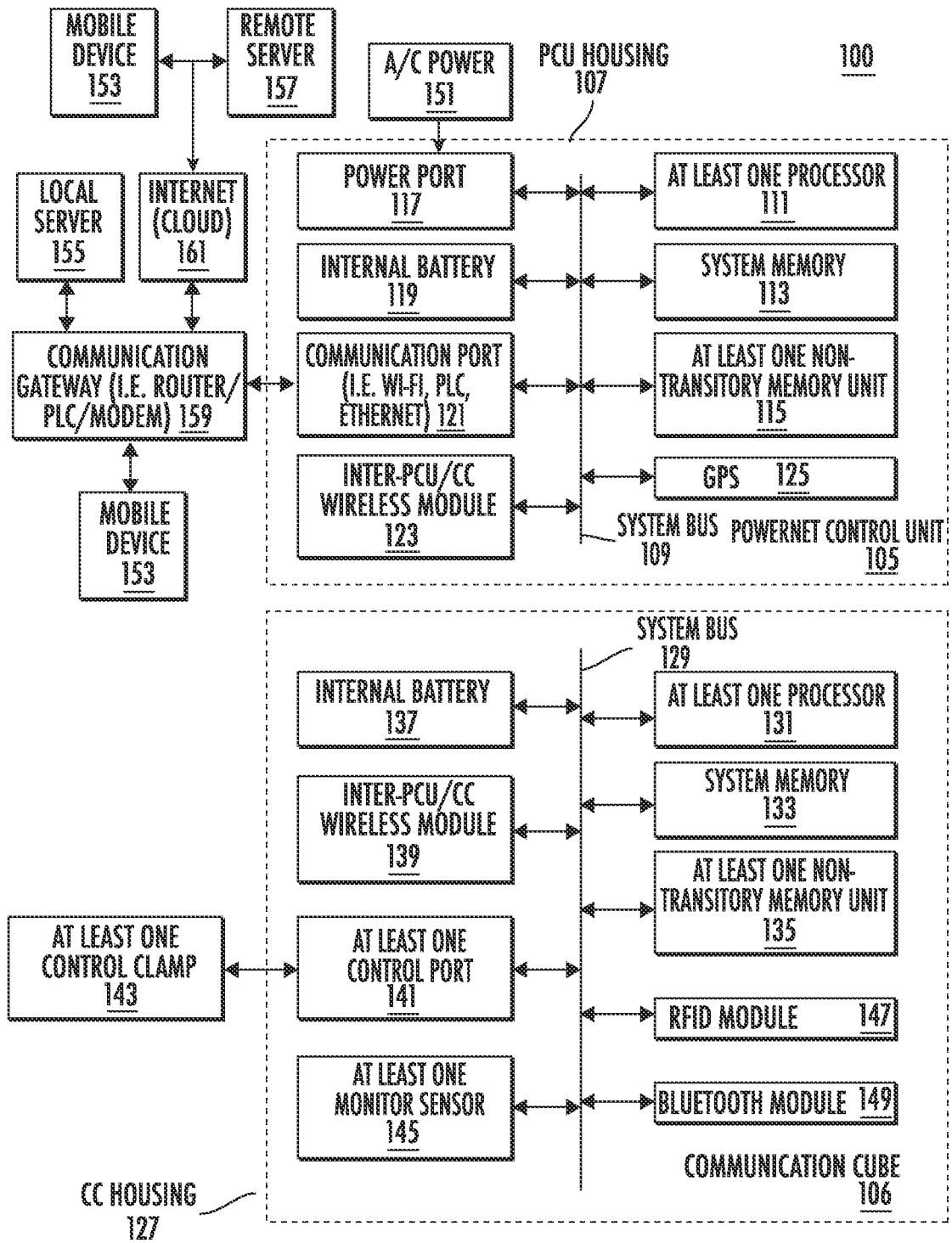
FIG. 1 is a block diagram illustrating an apparatus for monitoring, controlling, and communicating in accordance with embodiments.

FIG. 1 is a block diagram illustrating an apparatus for monitoring, controlling, and communicating in accordance with embodiments.

In embodiments, apparatus 100 may comprise at least one powernet control unit and at least one communication cube. The powernet control unit (PCU) 105 may comprise a PCU housing 107, a system bus 109, at least one processor 111, system memory 113, at least one non-transitory memory unit 115, a power port 117, an internal battery 119, a communication port 121, an inter-PCU/CC wireless module 123, and a GPS module 125, all of which may be directly or indirectly coupled to each other. The communication cube (CC) 106 may comprise a CC housing 127, a system bus 129, at least one processor 131, system memory 133, at least one non-transitory memory unit 135, an internal battery 137, an inter-PCU/CC wireless module 139, at least one control port 141, at least one control clamp 143, at least one monitor sensor 145, a RFID module 147, and a Bluetooth module 149, all of which may be directly or indirectly coupled to each other. In the installation of the apparatus, the PCU 105 may be mounted on the back of a flat electrical strike plate and may be powered by the internal battery 119 or by A/C power 151 through the power port 117 in embodiments. In embodiments, the communication port 121 may comprise at least one of a Wi-Fi radio, an Ethernet port, and a power line communication (PLC) bridge and may allow for the communication between powernet control units 105 and external control and monitoring devices such as mobile device 153, local server 155, and/or remote server 157. For Wi-Fi, PLC, and Ethernet, communication may be established through a communication gateway 159 such as a router/PLC/modem. Using a communication cube control web portal or a communication cube control app (PCU/CC dashboard application), at least one of the local servers 155 and the mobile device 153 may be used to communicate with the PCU 105 and the CC 106 through the communication gateway 159. Additionally, the communication gateway 159 may be connected to the Internet 161, thus making it possible for the remote server 157 and/or the mobile device 153, using a communication cube control web portal or a communication cube control app, to communicate with the PCU 105 and the CC 106. The PCU 105 may communicate with the CC 106 through the inter-PCU/CC wireless module 123 of the PCU 105 with the inter-PCU/CC wireless module 139 of the CC 106. The inter-PCU/CC wireless modules 123, 139 may comprise at least one of a Bluetooth radio, 6LoWPan radio, and ZigBee radio. Bluetooth, 6LoWPan, and ZigBee may encompass all past, current, and future versions of the wireless protocols. The powernet control units which are connected to the PLC may be nodes which in turn may be in communication with the communication cubes 106. Each PCU node may be capable of identifying the communication cubes 106 which are connected to it. This network of communication cubes 106 connected to PCU nodes which are connected via PLC may be referred to as a powernet.

In embodiments, the CC 106 may be mounted within a lighting fixture and may be powered by the internal battery 137 or by one of the at least one control clamp 143 spliced into the power line to the lighting fixture. The control clamp may be designed to splice the power line to a lighting fixture without having to shut down power to the lighting fixture or device. After splicing the power line, direct power to the lighting fixture may be removed and the CC 106 may now be capable of controlling the lighting fixture or device, thus enabling control for dimming, color, and other primary and secondary functions such as, but not limited to Li-Fi management and emergency controls. Since the control clamp 143 is tapped into the power line, the control clamp 143 may also be able to provide power to the CC 106 through the control port 141. The CC 106 may also comprise at least one monitor sensor 145 to monitor for occupancy in the area of the lighting fixture as well as the lighting fixture location and status.

In embodiments, the RFID module 147 and Bluetooth module 149 of the CC 106 may be used to establish a beacon. The RFID module 147 may be used to monitor the space around the lighting fixture or device for any RFID transmitters. In a hospital setting, the RFID transmitters may be mounted onto tables, drug carts, wheel chairs, etc. The CC 106 may then be able to keep track of the RFID transmitters in the vicinity of the lighting fixture. The Bluetooth module 149 may be used to continuously ping the area around the lighting fixture for any nearby Bluetooth enabled devices. The vast majority of phones and devices since 2006 may respond to this pinging, thus enabling the CC 106 to map and monitor the number of people that are carrying Bluetooth phones and devices that are in the vicinity of the lighting fixture. The processing of the RFID and Bluetooth monitoring may be handled locally by the at least one processor 131 of the CC 106. By having this map of people and things, if a patient is looking for a particular facility within the hospital, the path of least resistance (i.e. least congestion) for the patient to get to the particular facility may be determined from the data collected from RFID monitoring and Bluetooth pinging. This path may be transmitted to the patient who is running the hospital's mobile application on a Bluetooth enabled phone. In embodiments, the Bluetooth module 149 may be used to transmit offers, promotions, or other information to an individual with a Bluetooth enabled phone running a particular store or promotion mobile application. In such a scenario, if a customer is shopping at a grocery store and is running a store's mobile application on a Bluetooth enabled phone and the customer approaches the soft drink aisle, the CC 106 may be able to determine that the customer is in the soft drink aisle and may be able to present the customer offers and promotions for products that are also in the soft drink aisle. The CC 106 may present offers for products that are available since the CC 106 may use its RFID module 147 to detect for products labeled with RFID tags.

Figure 2:
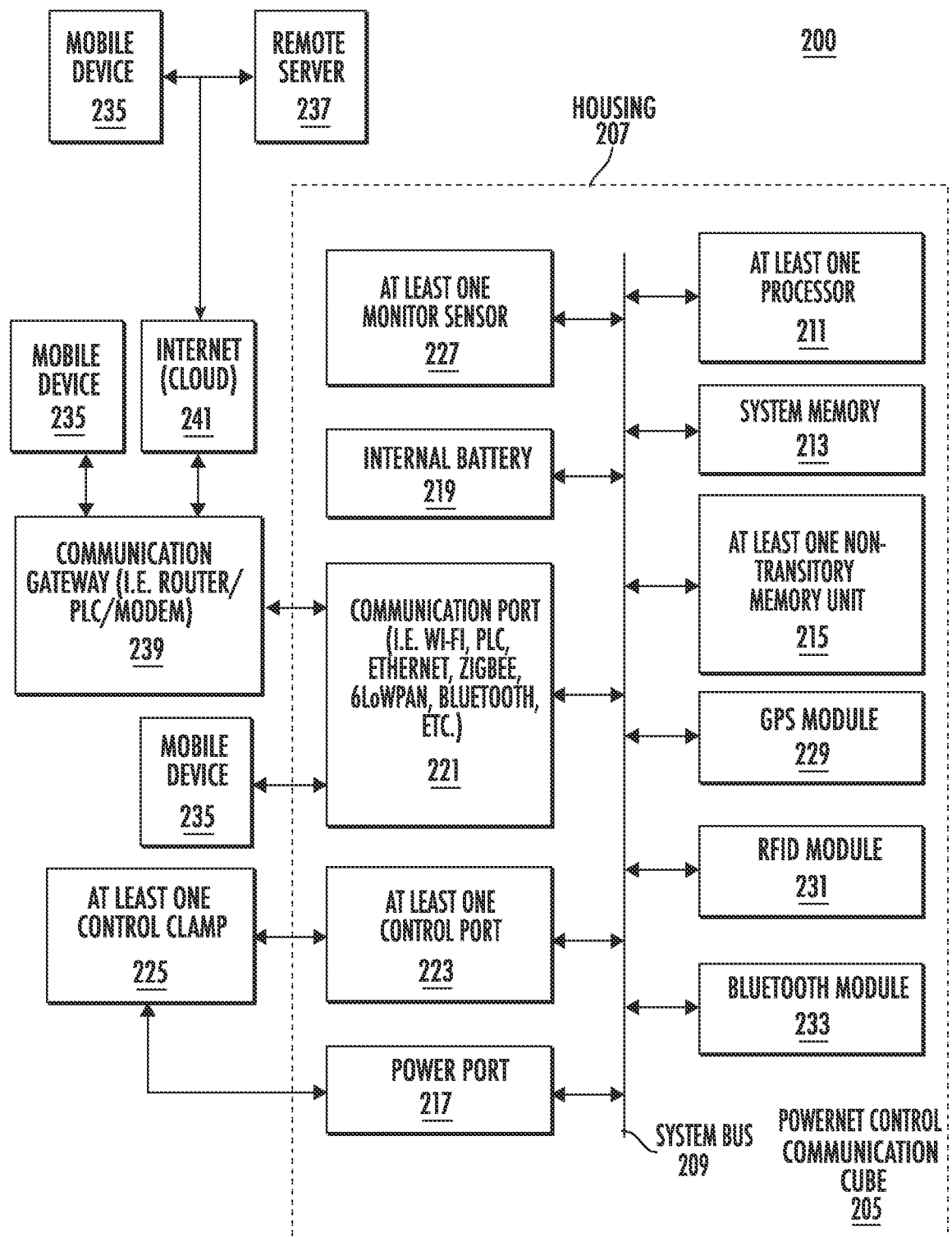
FIG. 2 is a block diagram illustrating an apparatus for monitoring, controlling, and communicating in accordance with embodiments.

FIG. 2 is a block diagram illustrating an apparatus for monitoring, controlling, and communicating in accordance with embodiments.

In embodiments, apparatus 200 may comprise at least one powernet control communication cube 205. The powernet control communication cube (PCCC) 205 may comprise a housing 207, a system bus 209, at least one processor 211, system memory 213, at least one non-transitory memory unit 215, a power port 217, an internal battery 219, a communication port 221, at least one control port 223, at least one control clamp 225, at least one monitor sensor 227, a GPS module 229, an RFID module 231, and a Bluetooth module 233, all of which may be directly or indirectly coupled to each other.

In embodiments, the PCCC 205 may be mounted within a lighting fixture or on the back of a flat electrical strike plate and may be powered by the internal battery 219 or by using one of the control clamps 225 coupled to the power port 217 to tap into a power line. Alternatively, the power port 217 may draw its power internally from one of the control clamps 225 connected to the control port 223. The communication port 221 may comprise at least one of a Wi-Fi radio, a PLC bridge, an Ethernet port, ZigBee radio, 6LoWPan radio, and a Bluetooth radio and may allow for the communication between powernet control communication cubes 205 and external control and monitoring devices such as mobile device 235 and remote server 237. Bluetooth, 6LoWPan, and ZigBee may encompass all past, current, and future versions of the wireless protocols. For Wi-Fi, PLC, and Ethernet, communication may be established through a communication gateway 239 such as a router/PLC/modem. Using a PCCC control web portal or a PCCC control app (PCCC dashboard application), the mobile device 235 may be used to communicate with the PCCC 205 through the communication gateway 239. Additionally, the communication gateway 239 may be connected to the Internet 241, thus making it possible for at least one of the remote servers 237 and the mobile device 235, using a PCCC control web portal or a PCCC control app, to communicate with the PCCC 205. Using the Bluetooth radio of the communication port 221, the mobile device 235 may also be capable of communicating with the PCCC 205 through the communication port 221. The powernet control communication cubes 205 may also communicate with each other through the communication port 221 using the Bluetooth radio, 6LoWPan radio, and/or ZigBee radio. The powernet control communication cubes 205 which are connected to the PLC may be nodes which in turn may be in communication with the powernet control communication cubes 205 which may not be connected to the PLC. Each PCCC node may be capable of identifying the powernet control communication cubes 205 which may be connected to it. This network of powernet control communication cubes 205 connected to PCCC nodes which are connected via PLC may be referred to as a powernet. Lastly, the GPS module 229 may provide location data for the PCCC 205 and may allow for the traceability of the PCCC 205 in event of its theft.

In embodiments, the RFID module 231 and Bluetooth module 233 of the PCCC 205 may be used to establish a beacon. The RFID module 231 may be used to monitor the space around the lighting fixture or device for any RFID transmitters. In a hospital setting, the RFID transmitters may be mounted onto tables, drug carts, wheel chairs, etc. The PCCC 205 may then be able to keep track of the RFID transmitters in the vicinity of the lighting fixture. The Bluetooth module 233 may be used to continuously ping the area around the lighting fixture for any nearby Bluetooth enabled devices. The vast majority of phones and devices since 2006 will respond to this pinging, thus enabling the PCCC 205 to map and monitor the number of people that are carrying Bluetooth phones and devices that may be in the vicinity of the lighting fixture. The processing of the RFID and Bluetooth monitoring may be handled locally by the at least one processor 211 of the PCCC 205. By having this map of people and things, if a patient is looking for a particular facility within the hospital, the path of least resistance (i.e. least congestion) for the patient to get to the particular facility may be determined from the data collected from RFID monitoring and Bluetooth pinging. This path may be transmitted to the patient who is running the hospital's mobile application on a Bluetooth enabled phone. In embodiments, the Bluetooth 233 may be used to transmit offers, promotions, or other information to an individual with a Bluetooth enabled phone running a particular store or promotion mobile application. In such a scenario, if a customer is shopping at a grocery store and is running a store's mobile application on a Bluetooth enabled phone and the customer approaches the soft drink aisle, the PCCC 205 may be able to determine that the customer is in the soft drink aisle and may be able to present the customer offers and promotions for products that are also in the soft drink aisle. The PCCC 205 may present offers for products that are available since the PCCC 205 uses its RFID module 231 to detect for products labeled with RFID tags.

Figure 3:
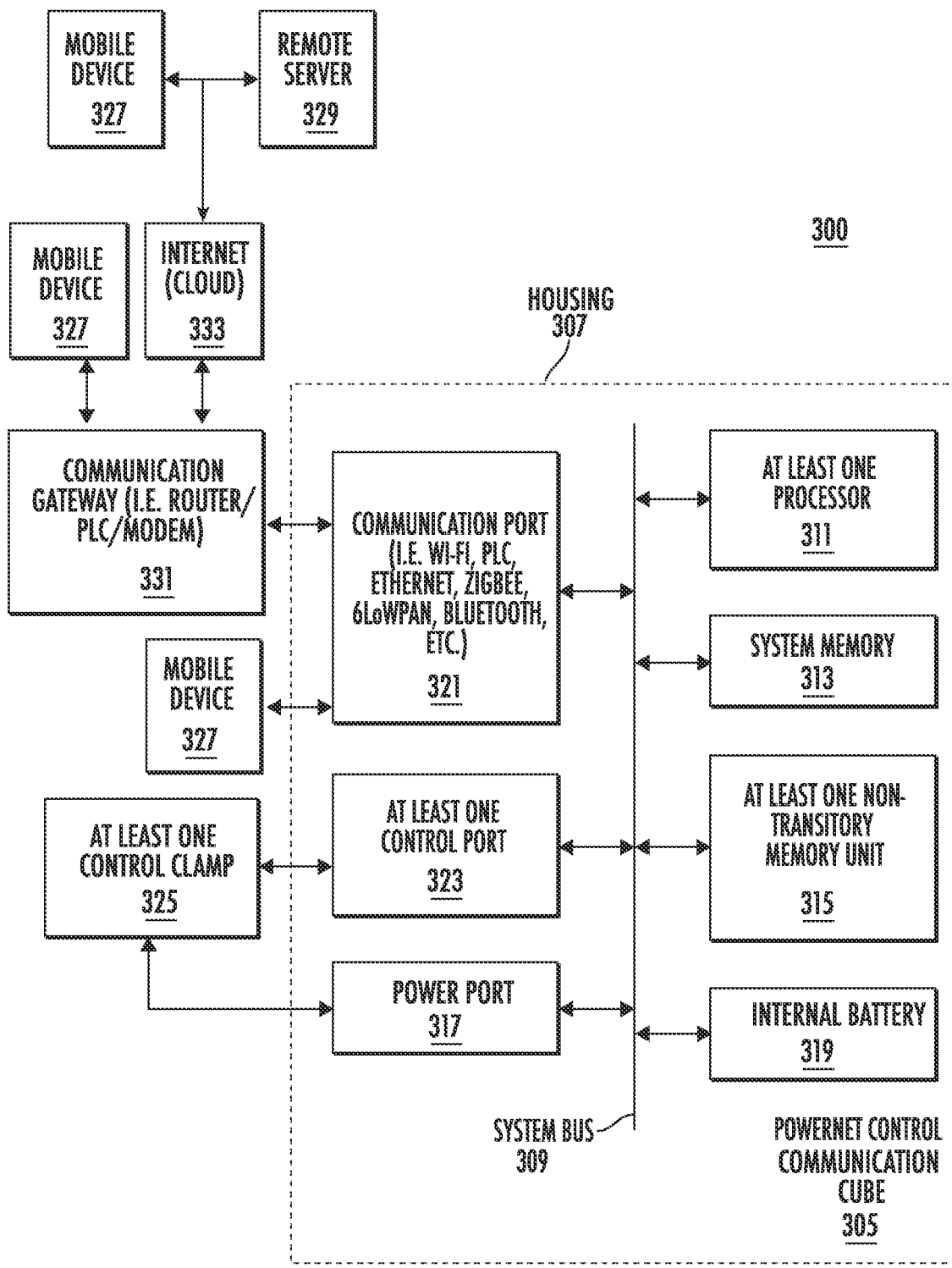
FIG. 3 is a block diagram illustrating an apparatus for monitoring, controlling, and communicating in accordance with embodiments.

FIG. 3 is a block diagram illustrating an apparatus for monitoring, controlling, and communicating in accordance with embodiments.

In embodiments, apparatus 300 may comprise at least one powernet control communication cube 305. The powernet control communication cube (PCCC) 305 may comprise a housing 307, a system bus 309, at least one processor 311, system memory 313, at least one non-transitory memory unit 315, a power port 317, an internal battery 319, a communication port 321, at least one control port 323, and at least one control clamp 325, all of which may be directly or indirectly coupled to each other.

In embodiments, the PCCC 305 may be mounted within a lighting fixture or on the back of a flat electrical strike plate and may be powered by the internal battery 319 or by using one of the control clamps 325 coupled to the power port 317 to tap into a power line. Alternatively, the power port 317 may draw its power internally from one of the control clamps 325 connected to the control port 323. The communication port 321 may comprise at least one of a Wi-Fi radio, a PLC bridge, an Ethernet port, ZigBee radio, 6LoWPan radio, and a Bluetooth radio and may allow for the communication between powernet control communication cubes 305 and external control and monitoring devices such as at least one of a mobile device 327 and a remote server 329. Bluetooth, 6LoWPan, and ZigBee may encompass all past, current, and future versions of the wireless protocols. For Wi-Fi, PLC, and Ethernet, communication may be established through a communication gateway 331 such as a router/PLC/modem. Using a PCCC control web portal or a PCCC control app (PCCC dashboard application), the mobile device 327 may be used to communicate with the PCCC 305 through the communication gateway 331. Additionally, the communication gateway 331 may be connected to the Internet 333, thus making it possible for at least one of the remote servers 329 and the mobile device 327, using a PCCC control web portal or a PCCC control app, to communicate with the PCCC 305. Using the Bluetooth radio of the communication port 321, the mobile device 327 may also be capable of communicating with the PCCC 305 through the communication port 321. The powernet control communication cubes 305 may also communicate with each other through the communication port 321 using the Bluetooth radio, 6LoWPan radio, and/or ZigBee radio. The powernet control communication cubes 305 which may be connected to the PLC may be nodes which in turn may be in communication with the powernet control communication cubes which are not connected to the PLC. Each PCCC node may be capable of identifying the powernet control communication cubes 305 which may be connected to it. This network of powernet control communication cubes 305 connected to PCCC nodes which are connected via PLC may be referred to as a powernet.

In embodiments, the PCCC 305 may be used to control a single lamp, a single fixture, and/or a series of fixtures. For such an embodiment, the PCCC 305 may be mounted within the lighting fixture and may be powered by the internal battery 319 or by one of the at least one control clamp 325 spliced into the power line to the lighting fixture. The control clamp 325 may be designed to splice the power line to a lighting fixture without having to shut down power to the lighting fixture or device. After splicing the power line, direct power to the lighting fixture may be removed and the PCCC 305 may now be capable of controlling the lighting fixture, thus enabling control for dimming, color, and other primary and secondary functions such as, but not limited to Li-Fi management and emergency controls. Since the control clamp is tapped into the power line, the control clamp may also be able to provide power to the PCCC 305 through the power port 317. This embodiment was similarly disclosed in FIG. 2, except that in this embodiment, the components not required for controlling a lighting system, (the at least one monitor sensor, the GPS, the RFID, and Bluetooth) have been eliminated.

In embodiments, the components for communication through the communication gateway may be separated from the components for communication between the powernet control communication cubes 305. In such an embodiment, the powernet control unit may comprise at least one of the Wi-Fi radio, the Ethernet port, and the power line communication (PLC) bridge and the communication cube 305 may comprise at least one of a Bluetooth radio, 6LoWPan radio, and ZigBee radio, as was similarly disclosed in FIG. 1, except that in this embodiment, the components not required for controlling a lighting system (the at least one monitor sensor, the GPS, the RFID, and Bluetooth) have been eliminated.

Figure 4:
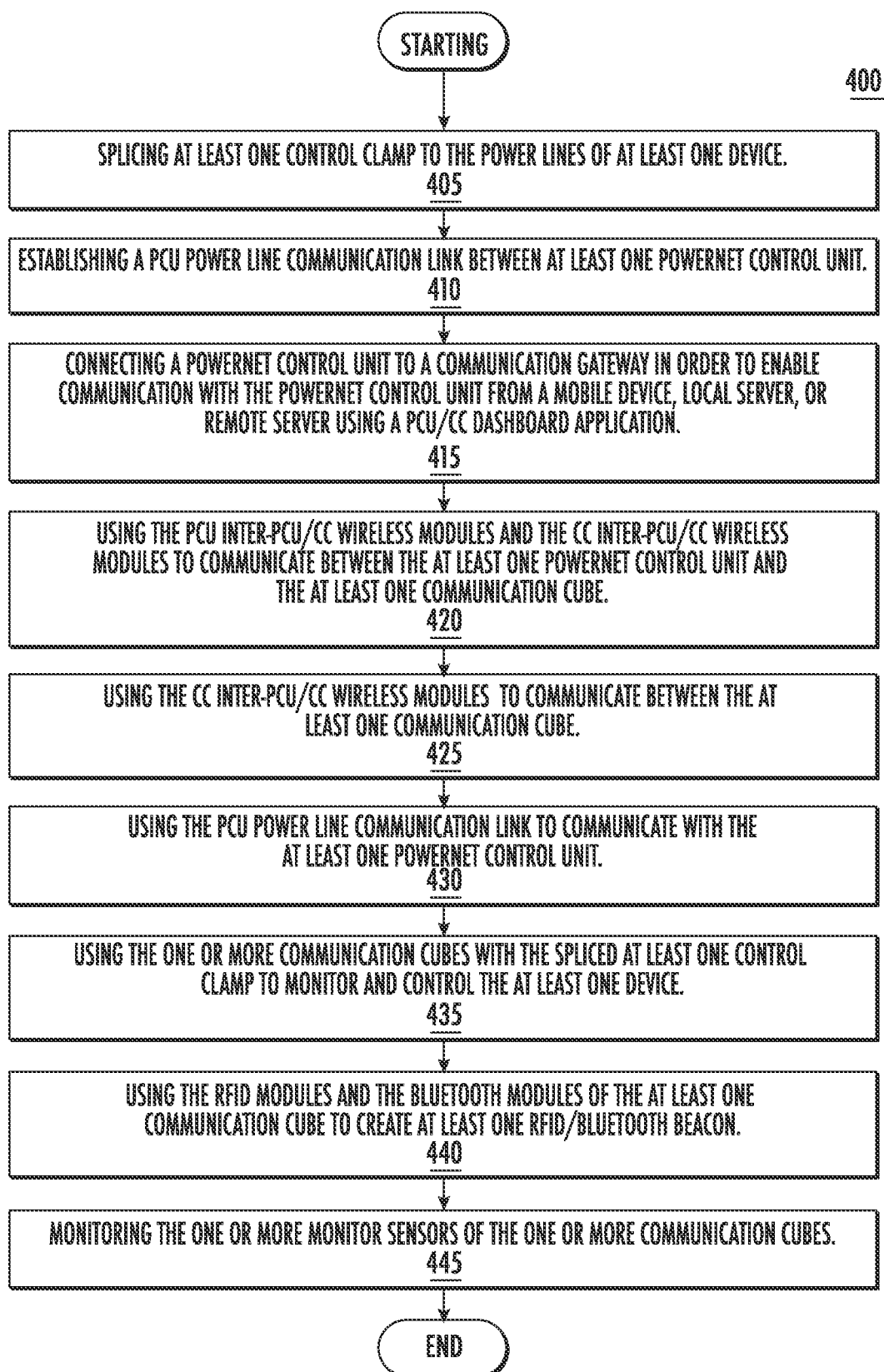
FIG. 4 is a block diagram illustrating a method for monitoring, controlling, and communicating of devices in accordance with embodiments.

FIG. 4 is a block diagram illustrating a method for monitoring, controlling, and communicating of devices in accordance with embodiments.

In embodiments, PCU code and CC code may be stored on the at least one PCU non-transitory memory unit and the at least one CC non-transitory memory unit, respectively, and executed by the at least one PCU processor and by the at least one CC processor, respectively, to perform a method 400 for monitoring, controlling, and communicating of devices. The method 400 illustrated in FIG. 4 may be performed by the apparatus illustrated in FIG. 1. Processing may begin in method 400 at block 405, wherein at least one control clamp may be spliced to the power lines of at least one device.

At block 410, a PCU power line communication link may be established for communication between at least one powernet control unit in embodiments.

At block 415, a powernet control unit may be connected to a communication gateway in order to enable communication with the powernet control unit from a mobile device, local server, or remote server using a PCU/CC dashboard application in embodiments.

At block 420, the PCU inter-PCU/CC wireless modules and the CC inter-PCU/CC wireless modules may be used to communicate between the at least one powernet control unit and the at least one communication cube in embodiments.

At block 425, the CC inter-PCU/CC wireless modules may be used to communicate between the at least one communication cubes in embodiments.

At block 430, the PCU power line communication link may be used to communicate with the at least one powernet control unit in embodiments.

At block 435, the at least one communication cube with the spliced at least one control clamp may be used to monitor and control the at least one device in embodiments.

At block 440, the RFID modules and the Bluetooth modules of the at least one communication cube may be used to create at least one RFID/Bluetooth beacon in embodiments.

At block 445, the at least one monitor sensor of the at least one communication cube may be monitored in embodiments. The at least one monitor sensor may be used to monitor for occupancy in the area of the device as well as the device location and status. Processing may subsequently end after block 445 in embodiments.

Figure 5:
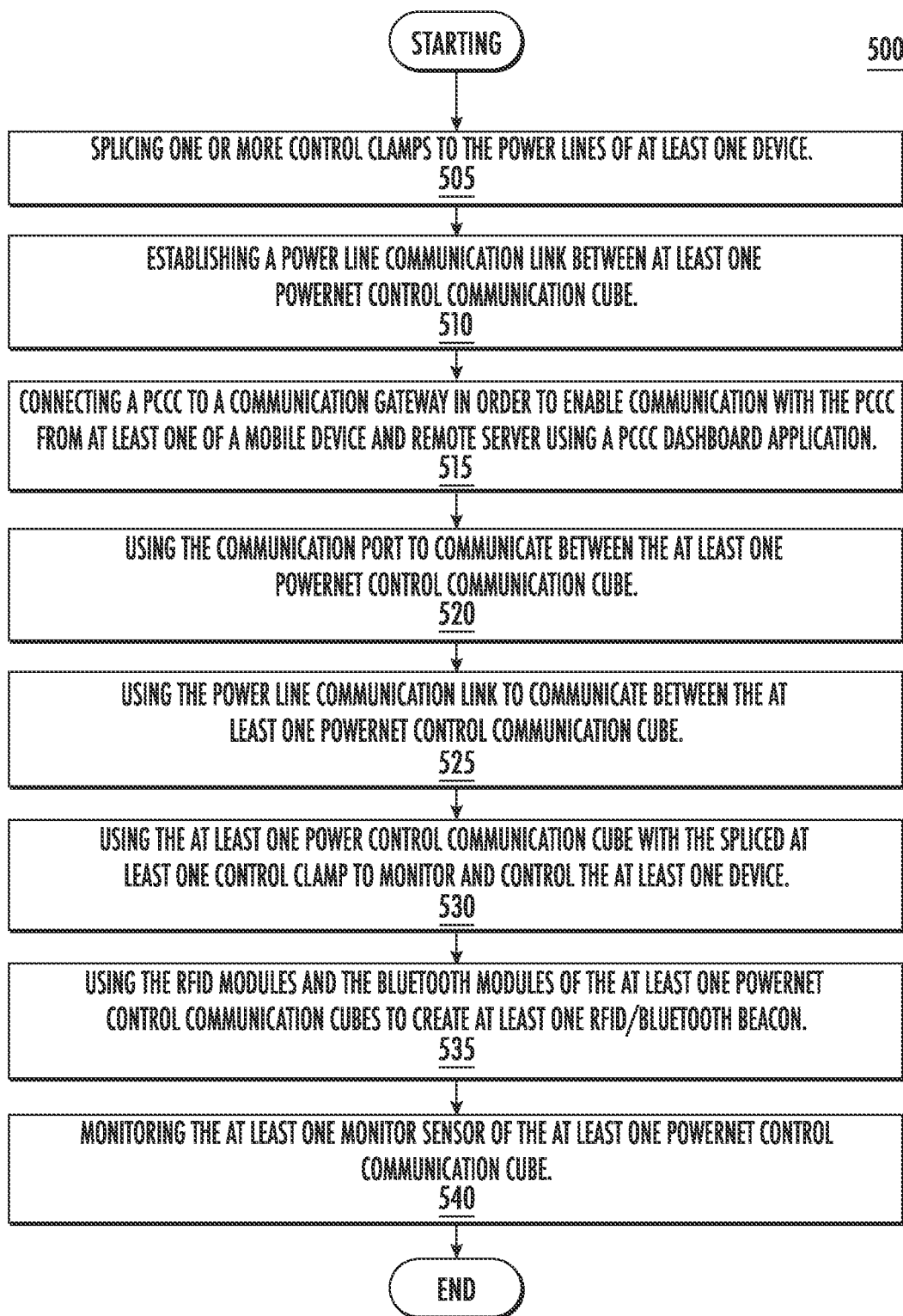
FIG. 5 is a block diagram illustrating a method for monitoring, controlling, and communicating of devices in accordance with embodiments.

FIG. 5 is a block diagram illustrating a method for monitoring, controlling, and communicating of devices in accordance with embodiments.

In embodiments, PCCC code may be stored on the at least one non-transitory memory unit and may be executed by the at least one processor to perform a method 500 for monitoring, controlling, and communication of devices. The method 500 illustrated in FIG. 5 may be performed by the apparatuses illustrated in FIG. 2 and FIG. 3. Processing may begin in method 500 at block 505, wherein at least one control clamp may be spliced to the power lines of at least one device.

At block 510, a power line communication link may be established for communication between at least one powernet control communication cube in embodiments.

At block 515, a PCCC may be connected to a communication gateway in order to enable communication with the PCCC from a mobile device and/or remote server using a PCCC dashboard application in embodiments.

At block 520, the communication port may be used to communicate between the at least one powernet control communication cube in embodiments.

At block 525, the power line communication link may be used to communicate between the at least one powernet control communication cube in embodiments.

At block 530, the at least one powernet control communication cube with the spliced at least one control clamp may be used to monitor and control the at least one device in embodiments.

At block 535, the RFID modules and the Bluetooth modules of the at least one powernet control communication cube may be used to create at least one RFID/Bluetooth beacon in embodiments.

At block 540, the at least one monitor sensor of the at least one powernet control communication cube may be monitored. The at least one monitor sensor may be used to monitor for occupancy in the area of the device as well as the device location and status. Processing may subsequently end after block 540 in embodiments.

Embodiments described herein relate to a computer storage product with at least one non-transitory memory unit having instructions or computer code thereon for performing various computer-implemented operations. The at least one memory unit are non-transitory in the sense that they do not include transitory propagating signals per se (e.g., a propagating electromagnetic wave carrying information on a transmission medium such as space or a cable). The at least one memory unit and computer code (also can be referred to as code) may be those designed and constructed for the specific purpose or purposes. Examples of at least one memory unit include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM), and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, Python, C, or other programming languages (e.g., object-oriented programming languages) and development tools. Additional examples of computer code include, but are not limited to, control signals, encrypted code, database code, and compressed code.

As discussed, a single multifunction communications cube (MCC) may have multiple means or subsystems for receiving and transmitting digital information. It will be understood that a multifunction communication cube (MCC) may include all, or a subset, of the same or similar components, features, and functionality of apparatus 100, apparatus 200, and apparatus 300 described in detail elsewhere in this application. The MCC may use its communications subsystems or inputs (Wi-Fi, ZigBee, Bluetooth, PCL, Ethernet, etc.) to generate a "digital impression" or "digital profile" including digital impression information of the devices in its environment. The digital impression may contain essentially all, or a subset of, signal information across all of the CC's detection means for each and every device that the MCC can detect. The digital impression information collected about different devices in the environment of the MCC may differ in relation to signal information available and collected by the CC. The MCC may monitor all of the inputs simultaneously, or in any suitable order to generate such a digital impression. Monitoring of inputs by the MCC may include monitoring all or a subset of communications subsystems of the CC. This digital impression may be limited only by the inherent limitations of the different input methodologies or input subsystems of the CC. In an embodiment, for example, the CC's ability to monitor devices via its PLC inputs may be limited to devices connected to an electrical circuit accessible to the CC, while the devices observable via the CC's Bluetooth and Wi-Fi inputs may be limited to the communication reception ranges determined by each device's Bluetooth antenna range and Wi-Fi antenna range. The signal information from all inputs available to the MCC may be aggregated to generate the digital impression. Multiple CCs with overlapping sensor ranges may have separate digital impressions that contain devices that overlap, or alternatively, may be aggregated together to create a single, more thorough or complete digital impression of the devices around the plurality of networked CCs. In an embodiment, for example, a first MCC and second MCC in communication, directly or indirectly via other intermediate CC's relaying communications information between the first MCC and second CC, may have combined, coordinated, or cooperative capability to identify, monitor, and interact with devices via PLC inputs connected to any electrical circuit accessible or connected to either the first MCC and the second CC, and further may have combined, coordinated or cooperative capability to identify, monitor and interact with the same or other devices via Bluetooth and Wi-Fi inputs within wireless communication range of both the first MCC and second CC. In such an embodiment, for example, digital impressions of each of a plurality of devices may include digital impression information obtained via PLC inputs, Bluetooth inputs, and Wi-Fi inputs, of each and every device observable, directly or indirectly, by the first MCC and second CC.

In an exemplary scenario, if a MCC is installed into a powerline circuit in a room with a Wi-Fi enabled smart TV that is connected to the same powerline circuit as the CC, a Bluetooth and Wi-Fi enabled cell phone sitting by itself on a desk in the next room over, and a ZigBee enabled smoke detector connected to a separate powerline circuit in the hall between the two rooms, the MCC may receive both a PLC signal and a Wi-Fi signal from the TV, both Wi-Fi and Bluetooth signals from the cell phone, and a ZigBee signal from the smoke detector. The digital impression generated by the MCC would comprise all of these signals together.

The CC's onboard processor may aggregate this sensor data in order to generate the digital impression of the CC's environment. The MCC may then use its processor and information contained on its onboard memory to identify digital signatures of the different devices constituting the digital impression. If the digital impression cannot be disambiguated to determine the unique signatures identifying the constituent devices, the MCC may use one or more of its communications pathways to transmit the digital impression to a remote server, which may have access to more data and processing capabilities than the CC's onboard hardware in order to disambiguate the digital impression and determine what devices are being sensed by the CC. Once the digital impression has been disambiguated and the unique devices sensed by the MCC are identified that information along with control information for those devices may be communicated from the remote server back to the MCC through a suitable communication network. The unique device information may comprise information such as the make and model of the device, and may further comprise control information including, but not limited to control signals compatible with the identified device through one or more communications means, and a hierarchy of what communications means are preferred for controlling said device. Whether or not the MCC can determine the devices constituting the digital impression through onboard processing versus offboard processing at a remote server may be a question of the CC's form factor and current hardware limitations.

Once the MCC has either determined the identity of the devices that it sensed in its digital impression, or has received such information from the remote server, the MCC may then use any of the output methods available to it to communicate with and control the unique devices whose signals were include in the CC's digital impression. The determination of what communication means should be used to control which unique device may be associated with the information used to identify of the unique devices, and may be determined when the unique devices are identified. This control and control preference information may be stored either on the CC's or on the remote server's memory. This selection of the means by which to control the devices may be limited to the manner in which the MCC can communicate with that particular device (it would not be helpful for the MCC to try to control a Wi-Fi enabled TV via Wi-Fi if either the MCC does not possess Wi-Fi functionality, or if the MCC is in only powerline communication with the TV).

Continuing with the example provided above, once the MCC has formed a digital impression of its environment, including the PLC signature of the TV, the Wi-Fi signatures of the TV and the smartphone, the Bluetooth signature of the smartphone, and the ZigBee signature of the smoke detector, it may transmit this impression to a remote server, and receive back from the server information indicating the three devices and their control preferences. The stored device information indicates that the TV may be controlled via PLC, infra-red (IR), and Wi-Fi, but prefers to be controlled via IR or Wi-Fi; the smartphone prefers to be controlled by Bluetooth rather than Wi-Fi; and the smoke detector can be controlled by PLC or ZigBee and has no preference on which is better. In such a case, the MCC would control the TV via Wi-Fi as it is preferred over PLC and the MCC does not possess IR; the smartphone via Bluetooth as it is preferred over PLC; and the smoke detector via ZigBee as it is the only connection that the MCC has to that device.

In embodiments, the MCC may be limited to having fewer than all of the possible input and communications means. For example, one MCC may be configured for Ethernet and PLC communication only, while another MCC may be configured for Ethernet and Bluetooth communication only, while yet another MCC may be configured for wireless, Bluetooth, and PLC communication. Any permutation or combination of communication means may be provided for on any specific MCC without departing from the scope of this disclosure. Embodiments without the capability of at least one communications means may be termed a "limited CC". Multiple differently limited CCs, for example one that is limited to Bluetooth and PLC, and one limited to Bluetooth and Wi-Fi, may communicate together via their shared communication protocol. In such an example the Bluetooth and PLC limited MCC may relay its digital impression to a remote server by using its shared communication protocol (in this case Bluetooth) to relay information to the other CC, which may then transmit both its digital impression and the digital impression received from the other limited MCC to the remote server via Wi-Fi.

In embodiments, a single MCC may be configured to use any and all suitable communications means.

Multiple CCs may be networked together via suitable communications networks. Multiple CCs in a particular physical location may be considered a "node". Multiple nodes may be connected together to form a network or MCC network. In embodiments, a single node may constitute a network or MCC network.

The CCs in a node may transmit and receive communications with one another in order to determine which of the CCs has the strongest connection to a communication network capable of transmitting information to a target device external to the node. The other CCs of the node may then relay information to the target device through the MCC with said strongest connection. The MCC through which the node's information is relayed may update in the event that the connection strength changes. This may allow all of the CCs in the node to be able to communicate with the remote device even if any particular MCC cannot directly communicate with said remote device. Furthermore, this relaying of information between networked CCs does not have to be direct, and may be indirect. For example, a first MCC may transmit information to a second CC, which may, in turn, transmit the information from the first MCC to a third CC, that may then transmit the information from the first MCC to a remote device. This ability to relay information through a series of networked CCs may also provide for a "gap jumping" ability, where an MCC that is not capable of transmitting directly to a remote device may relay information through one or a series of connected CCs until one of them is able to establish a connection to the remote device.

This relaying of information between networked CCs does not have to be direct, and may be indirect. In embodiments, a plurality of CCs constituting a node may be connected together in a mesh network configuration. Such a mesh network of CCs, for example, may relay information using either a flooding technique or a routing technique. To ensure all its paths' availability, the network may allow for continuous connections and should be able to reconfigure itself around broken paths, using self-healing algorithms. Self-healing allows a routing-based network to operate when a node breaks down or when a connection becomes unreliable. Utilizing such a mesh network configuration, a first MCC may transmit information to a second CC, which may in turn transmit the information from the first MCC to a third CC, that may then transmit the information from the first MCC to a remote device. This ability to relay information through a series of networked CCs may also provide for a "gap jumping" ability, where an MCC that is not capable of transmitting directly to a remote device may relay information through one or a series of connected CCs until one of them is able to establish a connection to the remote device.

Figure 15:
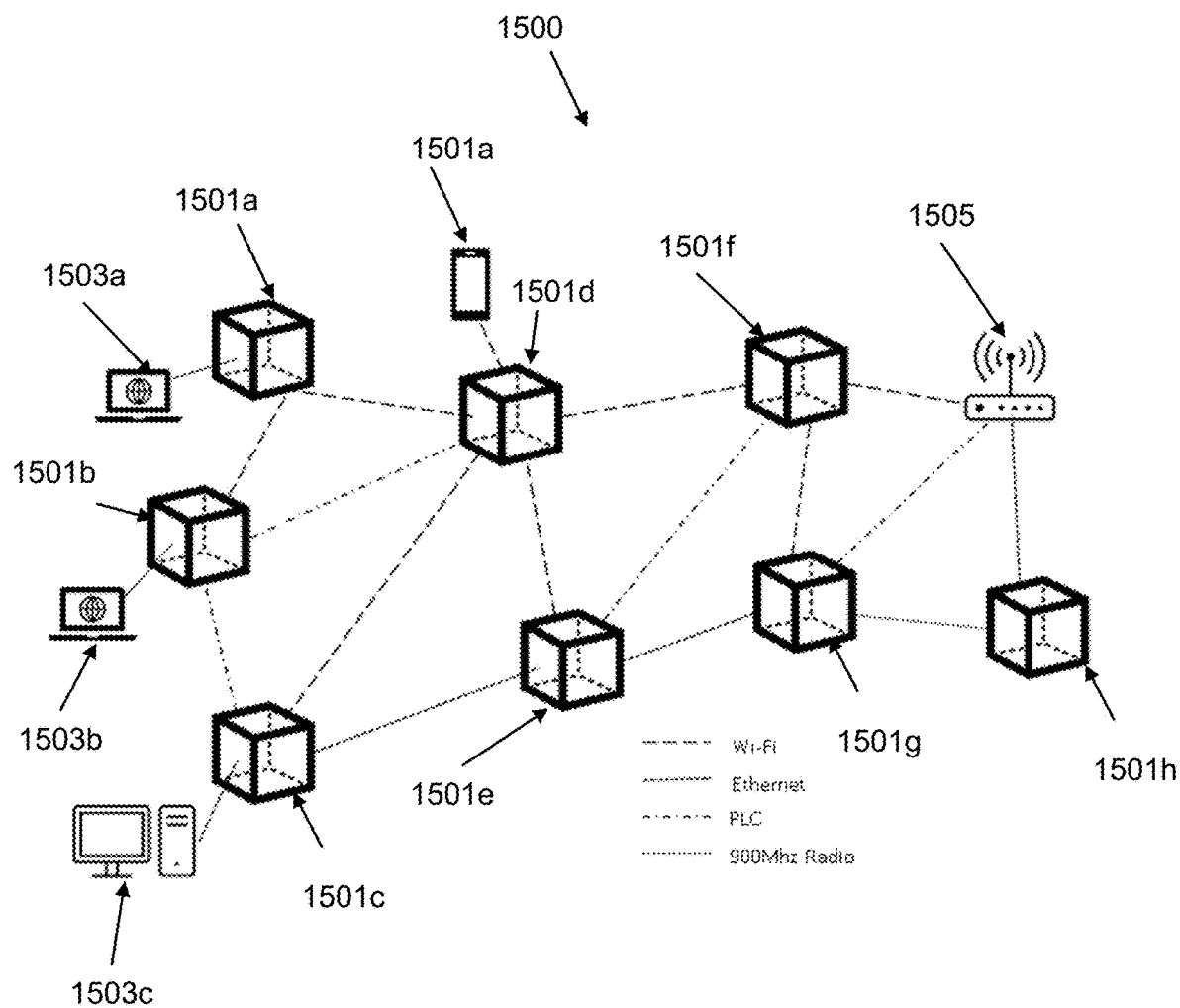
FIG. 15 is a diagram illustrating a sample mesh network environment in accordance with an embodiment of the present disclosure.

FIG. 15 is a diagram illustrating a network environment 1500 for purposes of describing a self-healing network embodiment. This network environment 1500 may correspond to a node mentioned above. For purposes of example, let us assume that the network environment 1500 comprises a plurality of CCs 1501a-1501h in an office building that are interconnected in a mesh network configuration. Each CC may be connected to one or more networked electronic devices 1503, such as computers, printers, cellular telephones, alarm system nodes, Wi-Fi routers, security cameras, digital temperature sensors (i.e., thermometers) and other environmental sensors, servers, and any other type of networkable electronic devices that might typically be found in an office building. In order not to obfuscate the drawing and the ensuing discussion, FIG. 15 shows only four of the electronic devices, namely, a first computer 1503a coupled to CC 1501a, a second computer 1503b coupled to CC 1501b, a server 1503c coupled to CC 1501c, and a smart phone 1503d coupled to CC 1501d. Each CC 1501 is able to communicate with at least one other CC, and, in most cases, with multiple other CCs, as shown, thereby forming a mesh network through which the electronic devices 1503 (as well as the CCs 1501) can communicate with each other and exchange data as needed. Each line (or edge) between any two CCs represents a direct communication path between those two CCs (hereinafter sometimes referred to as a "link"). As previously discussed, the various links may be of different communication modes. For example, in FIG. 15, the solid lines represent Digi 900 Mhz wireless communication links, the dot/dashed lines represent power line communication (PLC) links, the dashed lines represent Wi-Fi links, and the dotted lines represent Ethernet wired links.

Furthermore, as previously discussed, each CC 1501 may have more than one communication link with any other CC. For instance, CC 1501a may have an Ethernet link, a Wi-Fi link, and a PLC link with CC 1501b. However, again, for sake of not obfuscating the drawing, only one communication link per pair of CCs is assumed and shown in FIG. 15. Each CC may have a unique MAC address per communication mode. Thus, a CC that, for example, has Wi-Fi 2.4 GHz capabilities, Wi-Fi 5.2 GHz capabilities, Ethernet capabilities, and PLC capabilities would have four MAC addresses.

In this example, the network environment 1500 also includes a gateway 1505 that connects the network environment to the outside world, e.g., to the Internet, so that the devices 1503 and CCs 1501 can communicate with resources outside of the network environment in the building.

In an example, if computer 1503a needs to send data to a remote location outside of the network environment 1500, it would do so via the gateway 1505, which is a connection to outside world (e.g., the Internet). Thus, computer 1503a transmits the data to CC 1501a, which needs to get that data to the gateway 1505. However, CC 1501a does not have a direct connection to the gateway 1505. Thus, it must send the data to gateway 1505 via one or more other CCs 1501 in the network environment. As can be seen in FIG. 15, there are many options for transmitting the data from CC 1501a to gateway 1505. Merely as a few examples, in one case, the data can be transmitted from CC 1501a through CC 1501b, CC 1501c, CC 1501d, and 1501f to gateway 1505. This would comprise a total of five hops from the source CC 1501a to the gateway 1505. Alternately, it could be transmitted from CC 1501a through CC 1501e, and CC 1501f to gateway 1505. This route would comprise only three hops from source CC 1501a to gateway 1505. Many other routes also are available. Also, in certain cases, the network environment may have two or more gateways that connect to the internet, thereby providing an even greater variety of routes through the network environment to any given remote destination (as it would likely have multiple potential routes through the network environment to each of the gateways).

A routing algorithm through the mesh network should be selected to optimize the use of the network resources. As previously mentioned, there are many criteria that may be used to determine an optimal route through the mesh from any given CC to the gateway (or another CC, as the case may be). Example criteria include, minimizing the number of hops, maximizing the reliability of the communication of the data (e.g., minimizing BER), leveling the load sharing between the CCs, signal strength of the links, maximizing the security of the communication, etc., or any combination thereof.

Another consideration is the fact that network nodes, or at least links between network nodes, may become inoperable for a period of time (or permanently), and thus become, effectively, a dead end for data.

Thus, it is desirable to have a mesh routing technique that can route data around inoperable (or dead) nodes (or links) in the network. It also is desirable to have a mesh routing technique that can select a route through the nodes of the network between a source node of data and a destination node for the data that optimizes one or more criteria for communication (e.g., number of hops, data security along the route, load balancing, reliability/quality of link).

In an embodiment, software in the CC continually probes the connections that each CC finds with other CCs and nodes of the network environment. More particularly, each CC may send signals out on all of its output ports to discover the other nodes to which it has connectivity, and builds a list of communication links that it has with other nodes. In an embodiment, each communication link that a node has with another node may be identified by the relevant MAC address (each MAC address identifying both the node to which the connection exists and the communication mode of the connection, as previously mentioned). To determine the performance parameters of the various connections, the software may send out test signals and receive responses thereto to determine the performance of each connection. For instance, the software may test the speed of connections by transmitting a test signal on a connection and determining the time it takes to receive a response thereto. The software also may test the data rate of a connection, i.e., how fast the data is being read by the adjacent node. Many techniques for determining data rate of a connection are well-known in the related arts. The software also may test the reliability of the connection (e.g., the accuracy with which data transmitted over the connection is received) by sending test data signals over the connections to the other CCs requesting the other CC or node to reply by sending back the exact same data. The software can then check the differences between the transmitted data and the returned data and calculate an error rate. With respect to wireless connections, wireless signal strength may be determined. The radios for wireless transmitters and receivers typically are equipped with signal strength reading capabilities.

In an embodiment, each CC measures various quality parameters of its links with its neighboring CCs, such as bit error rate, round trip delay, signal strength (e.g., RSRP), and data rate. The CCs may also share this information with their neighboring CCs, and those neighboring CCs can share that data with further CCs that are neighbors to them. Thus, in theory, every CC may store a complete picture of the network environment and its status at any given time, and not just a picture of its direct connections.

The CCs may obtain some (or all) of the measurement data by observation and/or measurement during actual user (or control) data transmission. The CCs may obtain some (or all) of the measurement data by observation and/or measurement during special periods dedicated to measuring performance parameters of the network links, when user data is not transmitted over the network.

The network operator may determine one or more particular criteria that are to be considered for selecting the routing of data through the network from a source node to a destination node. In an embodiment, all the CCs may use the same criteria, e.g., minimizing the number of hops between source and destination or maximizing the data rate or maximizing the reliability of the transmission or a weighted combination of any two or more criteria. It also is possible to use different criteria at different CCs. It also is possible to change the criterion/criteria at different times. In some embodiments, the software may provide a user interface to allow the network operator to manually select the criterion/a to be used in the link selection algorithm.

A routing algorithm at each CC may determine the best route for a given data (e.g., a packet) through the network based, at least in part, on the criteria selected for determining what is considered the best route and corresponding measurement data that is relevant to that criteria.

In one embodiment, each CC builds and stores a routing table that may comprise a list of the available links to a next hop in order from best to worst (using the selected criteria for ranking and the measurement data relevant to that criteria). For example, if the selected criteria is reliability of the data, then the corresponding measurement data may be the measured bit error rate (BER) of each link to a neighboring CC. Thus, the routing table would list the links to neighboring CCs in order of BER from lowest (best) to highest (worst). Each CC may have a unique routing table since each CC may have a different set of links to other CCs and nodes.

The routing table may be updated periodically to stay abreast of the newest measurement data. For example, in an embodiment, the network environment may be programmed to stop communication of user (and control) data to take one or more measurements of relevant criteria for building the routing tables. Each CC can analyze the measurement data and update its routing table accordingly. In other embodiments, since some of the measurement data may be collected during normal use of the network for communication of user and/or control data without the need for measurement breaks, the update instances do not necessarily need to be tied in any way to measurement breaks.

As will be discussed in more detail below, CCs may also update their routing tables individually whenever they detect a broken link to another node.

Figure 16:
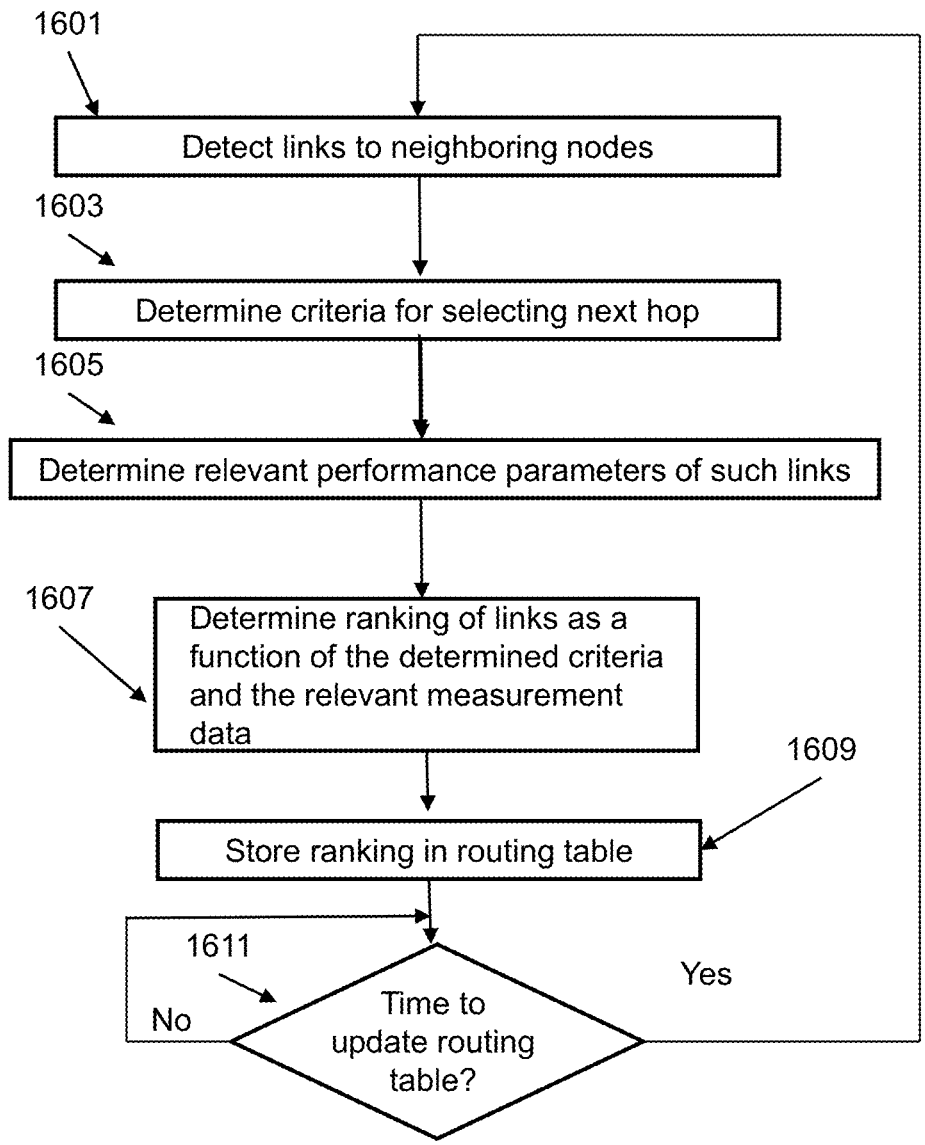
FIG. 16 is a flowchart illustrating a process for constructing a routing table in accordance with an embodiment.

FIG. 16 is a flowchart illustrating an exemplary embodiment of a routine that may be performed in a CC for building a routing table. In step 1601, the software in the CC detects the direct links (i.e., one hop) it has with other CCs and/or other nodes in the network environment. Note that, since this type of step is typically performed in the nodes of a mesh network in any event, it might be considered to not comprise part of the routine for building a routing table. In any event, next, in step 1603, The CC determines the criteria for selecting the next hop for data during mesh routing. As previously mentioned, both the criteria and the manner of determining it may take many forms. For instance, the criteria may comprise any one or more of BER, radio signal strength, data rate, distance, number of hops to destination node, etc. For instance, the manner of selecting the criteria may include any of being preconfigured, being selectable by the network operator through an appropriate user interface at a network control node, being self-configured on the fly based on other criteria, etc.

Next, in step 1605, the CCs measure the performance parameters of their various links that are relevant to the selected criteria. Of course, the CCs may measure even more performance parameters than those directly relevant to the current criteria for selecting a route since, as noted previously, the criteria may be changed as any moment, and thus, it may need such data at any moment. Also as previously noted, some, any, or all of these measurements may be taken during a dedicated measurement period and/or during normal operation of the network.

In step 1607, the CC determines the ranking of its various links as a function of the selected criteria and the measurements relevant to those criteria (e.g., if the criteria is BER, then it ranks the links from lowest BER to highest BER). In step 1609, it stores the ranked links in a routing table. As previously noted, the links may be identified by their MAC addresses, which dictates both the node to which the link connects and the communication mode of the link.

Also as previously, noted, the table may be updated from time to time. This is represented by step 1611. As previously discussed, the time for updating the table may be periodic at set time intervals. In other case, it may be a function of events that occurred in the network since the last update, such as determination that a certain number or percentage of links are down, a manual input by the network operator, a determination to change the criteria for selecting the next hop, etc.

Figure 17:
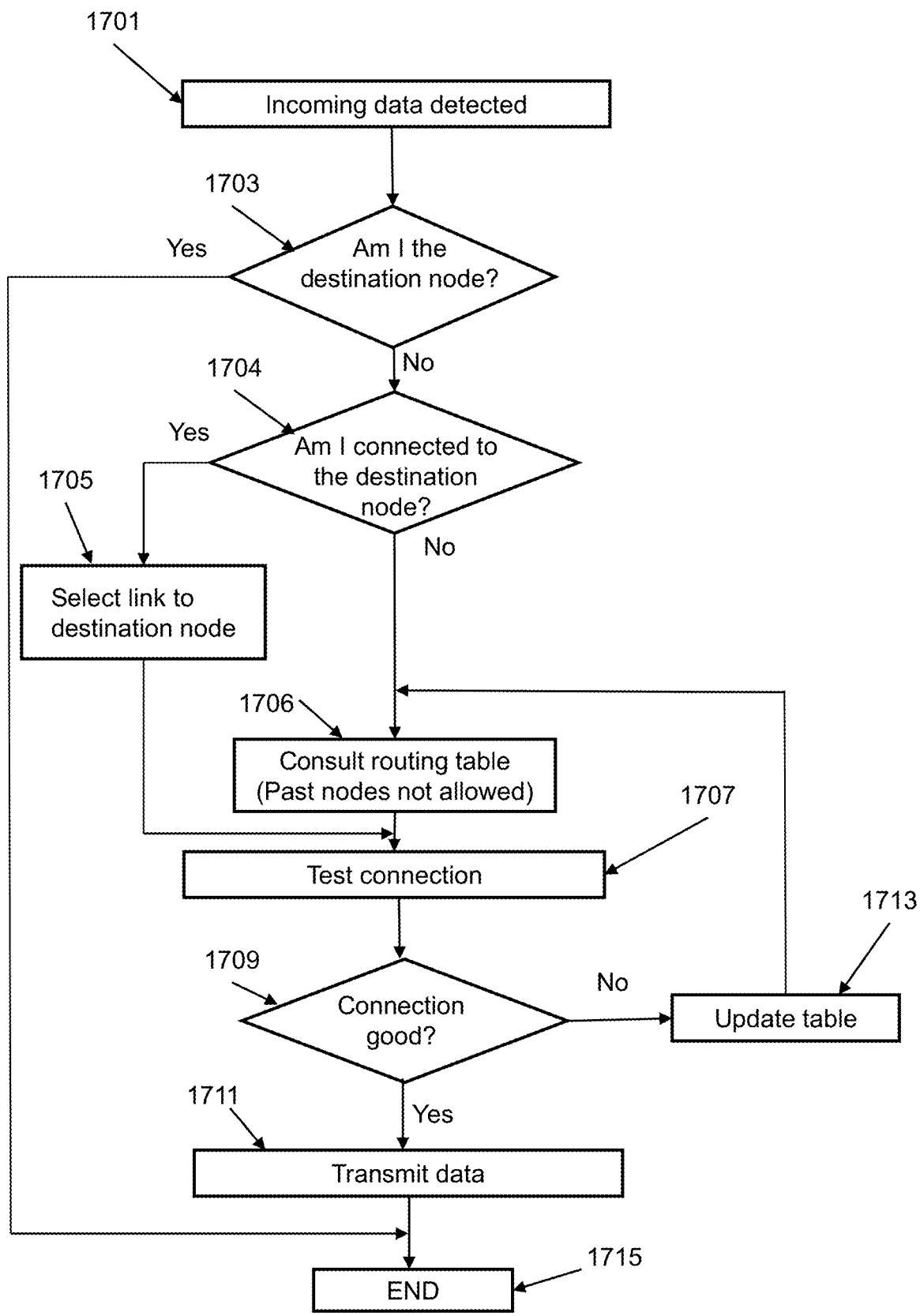
FIG. 17 is a flowchart illustrating routing of data through a mesh network in accordance with an embodiment.

FIG. 17 is a flowchart illustrating an exemplary embodiment of a routing algorithm that might be performed by a CC using the routing table discussed herein above. At step 1701, the CC receives input path data, e.g., a packet of data transmitted from a source device (e.g., a computer) and intended for a destination device (e.g., a remote node accessed via the Internet through the gateway 1505). Commonly, each incoming packet has a header identifying, among other things, the source of the data contained in the packet and the destination for that data. In fact, commonly, it will include information as to the entire path that the packet has traversed through the network environment. At 1703, the CC examines the header to determine if it is the destination CC, e.g., the CC that Is directly connected to the destination device. If so, the routing process ends at 1715 since the data has reached its destination and no further routing is necessary. Note that, in the example embodiments discussed in connection with FIGS. 15, 16, and 17, the routing scheme is being applied locally within the network environment. Thus, for any data packet that is intended for a remote location outside of the network environment, its destination CC may be considered any CC that is directly connected to the gateway 1505. Referring to FIG. 15, for example, if a packet is intended for an external destination, then any of nodes 1501*f*, 1501*g*, and 1501*h* would be deemed a destination CC.

Also note that the routing methods, apparatus, and schemes disclosed herein may be used in conjunction with other routing schemes, such as TCP/IP routing schemes. For instance, step 1704 is an example of one other such routing scheme or criteria that takes precedence over the routing scheme based on the routing table. Particularly, in step 1704, the node determines if it has a direct connection to the destination node, and, if so, it will override the use of the routing table and simply select the direct link to the destination node, as shown at step 1705. Thus, for instance, if a data packet had a destination outside of the network environment such that its "destination CC within the network environment could be any of nodes 1501*f*, 1501*g*, and 1501*h* (because they each have a direct connection to the gateway 1505), then any of CCs 1501*d* and 1501*e* would be considered to have a direct link to the destination CC.

If, on the other hand, the CC does not have a direct link to the destination CC, flow instead proceeds from step 1704 to step 1706, where the CC queries its routing table to determine the MAC address listed at the first position in the routing table. The first MAC address in the routing table indicates that it is the preferred link on which the packet should be transmitted based on the criteria that was selected to build the routing table. As previously noted, the MAC address dictates both the CC to which the packet should be transmitted and the communication mode for the transmission. As shown in step 1706, in order to increase efficiency, another condition may be imposed on the selection of the link from the routing table. Particularly, since the header of the packet typically contains the complete route information of the packet through the network environment up to its current state, a condition may be imposed (within step 1706, separately from step 1706, and/or as an overriding condition) that the packet cannot be transmitted to a CC that it has already passed through. Such a condition could prevent a packet from taking an unusually long route through the network environment to its destination (and possibly, even entering into an infinite loop within the network environment) if its next hop were dictated solely by the ranking in the routing table.

Next, at step 1707, the CC tests the connectivity of the selected communication link (whether it was selected in step 1706 using the routing table or in step 1705 using another criteria).

Although not shown in the flowchart of FIG. 17, if, in step 1704, the CC had, for instance, determined that it actually had more than one link to the destination CC (e.g., it has a Wi-Fi link as well as an Ethernet link to the destination CC), then, instead of proceeding directly from step 1705 to step 1707, in an embodiment, flow might actually proceed from step 1705 to step 1706, and the routing table could be used to choose between those two link options by picking the one of the two links that is ranked higher in the routing table.

In any event, next, at step 1709, if the CC receives a reply from the CC (indicating that the selected link is working), flow proceeds to step 1711, in which the data is transmitted over that link to the next CC. If, on the other hand, it cannot contact the selected CC over the selected link, then flow instead proceeds to step 1709, in which it updates its routing table to remove the communication link from the table. In an alternate embodiment, the CC may instead move that link to the bottom of the table, rather than delete it. In some embodiments, the CC may transmit an alert on the network informing the network of the failure. In yet other embodiments, the CC may facilitate repair of the failure.

Flow then proceeds from step 1709 back to step 1705, where the CC consults the newly updated table again and then selects the new node that is now at the top of the updated routing table. Flow will proceed through steps 1705, 1707, 1709 and 1711 to determine if the selected link is good and, if not, update the table as needed until a good link is found and the data gets transmitted (1711). Although not shown in the flow chart, if the routine reaches the last link in the table without finding a good link, then it will not be able to forward the data and may end without transmitting the data onward.

This testing of the connection and removing of the MAC address from the routing table by each CC in the network environment effectively constitutes a very fast self-healing process for the network. That is, each time a node (i.e., a communication path and communication mode) goes down, it is detected the next time a node attempts to transmit data over it.

While the above-described scheme, in some embodiments, does not necessarily transmit the packets to the destination CC in the fewest number of hops, it is quite efficient. Particularly, as the data is not broadcast to all nodes (only the nodes that are needed to send the data are used to send the data), the mesh network environment is efficiently utilized.

In an embodiment, a plurality of CCs may cooperate to identify and share digital impression information regarding network routers and network security devices, such as network security packet sniffers, of a secured network for evading detection by the secured network routers and network security devices while identifying, monitoring, interacting with, and controlling devices on the secured network. The plurality of CCs may establish and communicate over a separate mesh communications network, or over any other network accessible to the plurality of CCs. In embodiments, where the plurality of CCs may have developed and shared, or may have received from a remote server, digital impression information regarding network routers and network security devices at an established or acceptable confidence level, one or more of the plurality of CCs may communicate over a separate mesh network established between the plurality of CCs, and/or may communicate over the secured network according to protocols that are unidentifiable or undetectable by the secured network routers and network security devices so as to remain "dark" and undetected. In embodiments, one or more of the plurality of CCs may also communicate over the secured network according to protocols that are compatible, identifiable, or detectable by the secured network routers and network security devices so as to spoof or simulate other devices known to be on the network, or that might belong on the network, to misinform the secured network routers and network security devices regarding the security or unsecured status of the secured network, and/or also to misinform network security devices regarding operations and operating status of devices identifiable, or known, by the CCs. It will be understood that the term "devices" may include firmware and software associated with hardware devices or nodes.

In embodiments, CCs may automatically assign themselves identifiers. Automatic identification of the CCs may be performed, for example, in accordance with a 6LoPan protocol. A plurality of networked CCs may automatically share digital impression information for devices detectable by, or known to, any of the plurality of CCs, and automatically share instructions for monitoring, interacting with, and controlling such devices.

In an embodiment utilizing PLC monitoring and control of a device, the MCC may monitor the power line signals going through the circuit into which it is spliced. The MCC may also monitor wireless signals through a signal array including but not limited to WIFI, Bluetooth, RFID, ZigBee, and Specific Application Frequencies. The monitoring may be performed by the processor portion of the CC. The power line signals comprise waveforms that correspond to each of the electric devices on the circuit. Similarly, wireless devices can be identified by their respective MAC and IP address. A problem is presented that, because these signals are all running through the same power line, or through the same space in the instance of wireless signals, and into the same MCC device, the signals may become jumbled together or conflated, creating "signal noise". This signal noise on the PLC input to the MCC is a constituent part of the inputs that the MCC aggregates together to generate the digital impression. These individual signals within the digital impression and the signal noise must be disambiguated in order to identify the unique signals that are indicative of each unique device on the circuit. Signal strength and range are determined by a number of factors including but not limited to: whether there are physical barriers in between the transmitting and receiving devices, whether there is competing signal traffic, the relative strength of the signal being transmitted, the type of signal being transmitted, and the frequency the signal is being transmitted on.

In some embodiments, to disambiguate the unique device waveforms from signal noise of the PLC circuit, as well as the other signals picked up by the other input means or subsystems possessed by the MCC which constitute the digital impression, it is necessary to possess or access a database of signal waveforms and other unique device signatures and their associated devices. Such a database may comprise millions of unique signals each identifying a unique electrical device. For this reason, it may be impractical to maintain this database on the memory of an MCC itself. Instead a remote device, such as a remote server, may be used to store the unique signal information and to do or perform the processing of the data needed to identify and disambiguate the constituent unique signals that comprise the signal noise or conflated signals. To provide the signal noise information from the MCC to the remote server, the MCC may record a portion of the single noise and transmit it, via suitable network connection, to the server. The server may run an algorithm to analyze the segment of signal noise received from the MCC to differentiate the individual signals from the signal noise. Once the individual signals have been identified, the server can match them to signals from the database of unique signals and identify their respective electrical devices. In an embodiment, an MCC or remote server may process signal noise or conflated signals to eliminate, adjust or compensate for signals of identified devices in the jumbled signal noise or conflated signals, and thus simplify or reduce processing steps and time required to identify remaining devices from their characteristic signals remaining in the adjusted or compensated signal noise or conflated signals.

Once the devices associated with the disambiguated signals have been identified by the server, the server can then transmit the identity of the electrical devices associated with the portion of signal noise transmitted to it back to the CC. Once the MCC has received the identity of the devices on its circuit from the server, it may then use signal commands for the associated devices to control the devices on its circuit. Unlike the unique signal identification information stored on the server, which can comprise massive amounts of information, signal commands may be compatible between related types of electronic devices and therefore require significantly smaller amounts of memory to store. Therefore, in some embodiments, the database of signal commands may be stored locally in the MCC in a local memory. Once the MCC has determined or received signal commands associated with the electric devices on its' circuit, the MCC can then use its processor to transmit waveforms corresponding to the signal commands associated with a particular device to control certain known characteristics of the particular device's operation.

In embodiments, the manner in which the MCC may be able to control the devices on its circuit vary depending on the device. For power modulation where there may no digital management capability. For example, for incandescent light bulb or older TVs, the only options will be off/on dim up/dim down. Those "commands" are managed through increasing or decreasing the voltage and/or current being transmitted to the device being controlled through the powerline. The MCC may effectuate such a modulation of voltage and/or current through the use of a series of circuits, or through a series of resistors/transistors if analog. For other devices, which may be controlled wirelessly, the MCC may provide control signals to the device through a suitable wireless communication means (e.g. Wi-Fi, Bluetooth, IR, etc.) rather than through modulation of the waveform of the power line into which the device is connected. For example, The MCC may identify a smart TV through the power line and identify it as a TV, and may then implement a control profile identified as usable via Wi-Fi or IR. The preference of control methodology for the specific device may associated with the unique device once it is identified. The preferred control means may be limited by the communications capabilities of the MCC that is trying to control the device.

Generally, not all electrical circuits in a building are connected. Even circuits within the same breaker panel are often not directly connected. Whether it is for meeting code requirements, load limit restrictions, security, redundancy, reduction of single point failure, or convenience, multiple distinct electrical circuits are used. Addressing these hurdles when implementing a network is an additional advantage of the MCC over current technologies. Multiple CC's can be networked together to create a mesh network spanning large open areas. Multiple CC's can also be connected to communicate along that circuit over great distances and through physical barriers like floors, walls, and ceilings. These CCs may be able to communicate with one another through alternate compatible communications means or subsystems if one such means of communication is not available. For example, if two CCs both have Wi-Fi functionality and are within Wi-Fi range of one another, but are not connected to the same powerline circuit, the two CC's may communicate through the Wi-Fi network (or indirectly through the MCC mesh network) rather than communicating via PLC. Since all CCs in proximity are able to communicate as programmed (meeting designated network security requirements), either wirelessly, wired, or both, a network of CC's can "jump" significant distances between electrical circuits, through physical barriers like floors and walls where wireless signals would not otherwise penetrate via powerline, or through electromagnetic barriers, via a wireless and/or wired mesh network. It will be understood that electromagnetic barriers may include, for example, a Faraday cage electromagnetic barrier.

Figure 11:
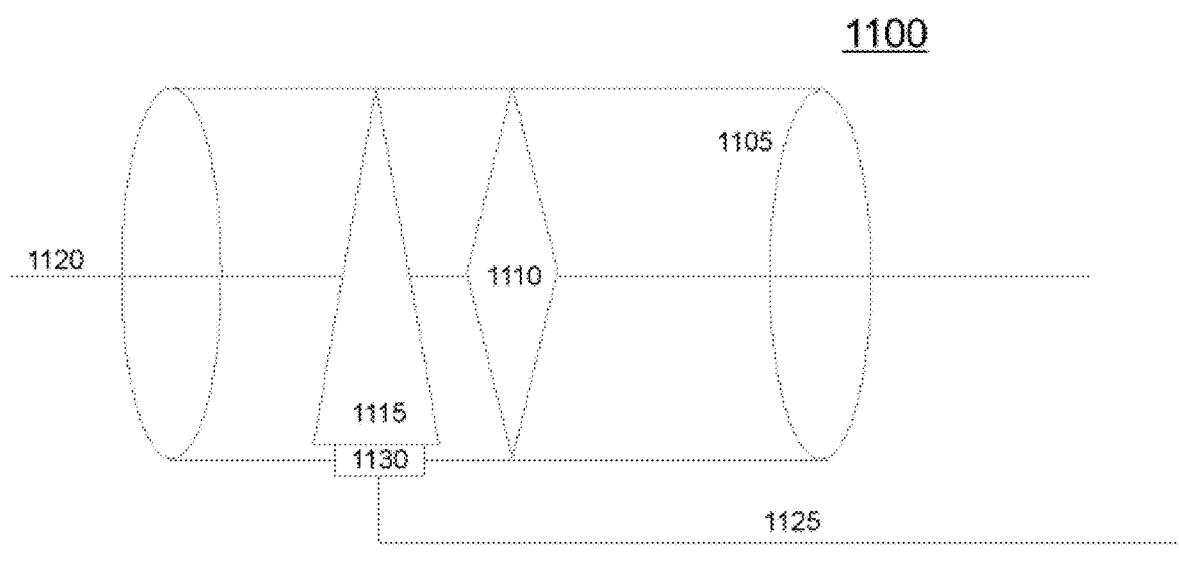
FIG. 11 illustrates aspects of a clamp for connecting a multifunction communication cube (MCC) to an electrical power circuit, in an embodiment.
Figure 12:
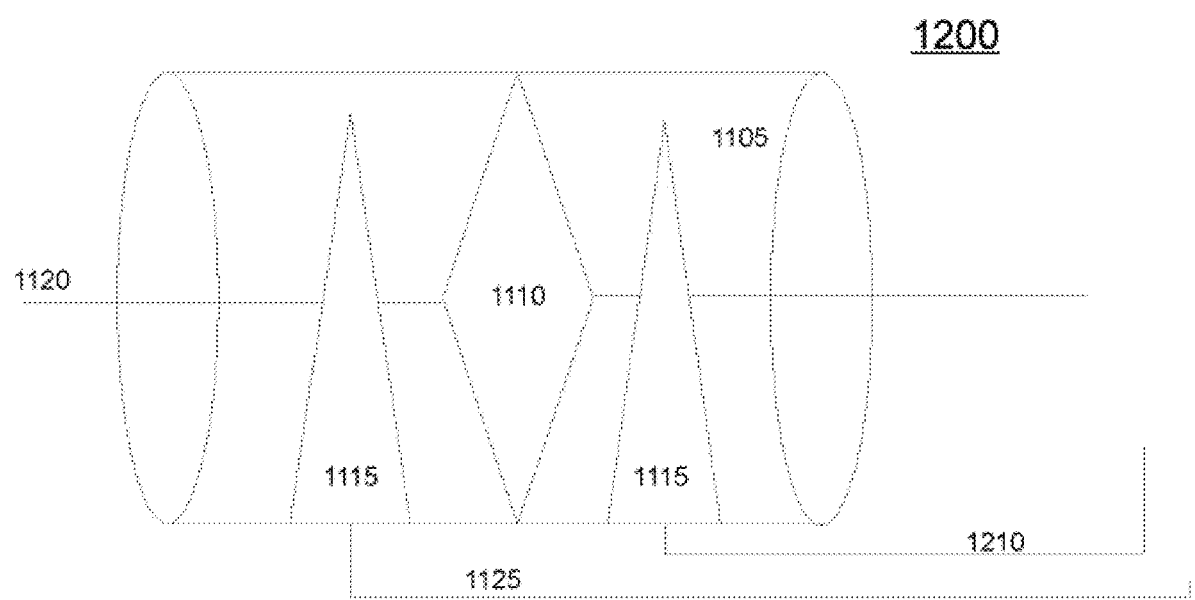
FIG. 12 illustrates aspects of a clamp for connecting a multifunction communication cube (MCC) to an electrical power circuit, in an embodiment.
Figure 13:
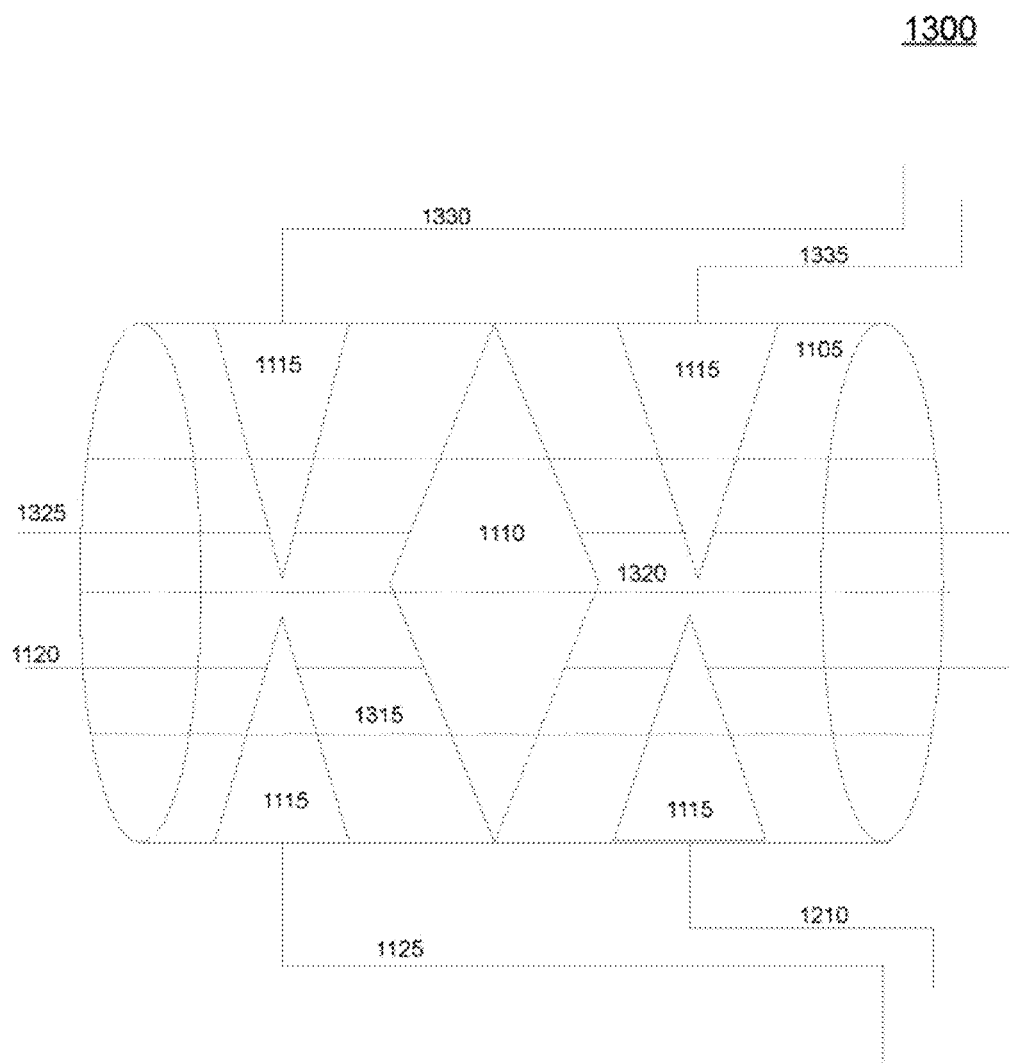
FIG. 13 illustrates aspects of a clamp for connecting a multifunction communication cube (MCC) to an electrical power circuit, in an embodiment.

As shown in FIGS. 11-13, a multifunction communication cube (MCC) may be connected or spliced into an electrical circuit without interrupting the downstream power flow of the circuit through use of a specially designed clamp. Referring to FIG. 11, clamp 1100 may be an insulated tube 1105 that has a single, non-conductive (glass, ceramic, etc.) blade 1110. In some embodiments, clamp 1100 may include a conductive blade 1115 that may be narrower at the top than at the bottom, and made of a conductive material (copper at minimum) and a contact pad 1130 connected to the top of the conductive blade via solder, wire etc. The contact pad 1130 allows for current to flow from the inside of the insulated tube 1105 to the outside of the insulated tube 1105. The contact pads 1130 have a wire connector 1125 that may transfer power from the insulated tube 1105 to an external device (not shown). It will be understood that this design accommodates a single wire 1120 conductor. FIG. 12 illustrates clamp 1200 in an alternative embodiment for tapping a single wire 1120 conductor. Clamp 1200 may accommodate one wire and may include two conductive blades 1115, positioned on opposite sides of the non-conductive blade 1110. Each of the two conductive blades 1115 may be attached to exiting wires 1125, and 1210, which may carry signals from each end of the severed wire 1120. In embodiments, such a clamp may splice the MCC into a conductor of a circuit while simultaneously transmitting current to devices on the circuit downstream of the CC.

To facilitate this non-interrupting splicing the power line wire may be laid inside of the insulated tube 1105. Once the wire 1120 is inside of the insulated tube 1105, the insulated tube 1105 is closed driving the non-conductive blade 1110 through the wire 1120 severing the connection between the upstream power source (upstream) and downstream powered device (downstream), and driving the conductive blades 1115 on either side of the non-conductive blade 1110 through the wire's insulation, causing the conductive blades 1115 to make electrical contact with the wire 1120 simultaneously. Contact being made with the wire 1120 and severing said wire 1120 will cause power to redirect through the conductive blades 1115. Power re-directed to the pads may be transferred from the pads on the outside of the tube to a wiring harness. This allows power to be diverted through the wire harness from the upstream side of the conductive blades to an external device (in this instance to CC). Once the MCC and clamp are connected to the power line, the power signal is processed, analyzed, manipulated etc. in the CC. Power may then be transmitted from the MCC through the clamp, through the wire harness connected to the downstream side and through the contact pad. Additionally, the MCC may provide signals via the power line by passing power signals and/or additional signals from the MCC through the contact pads to the conductive blades. The signals are then passed from the conductive blade to the downstream section of the wire in contact therewith. The power signals then pass along the wire to the device being powered, thus completing a single leg of the circuit. In the instance of a single wire clamp the process needs to be repeated for other the leg of the circuit.

Referring to FIG. 13, for a double-wire embodiment, in which the clamp 1300 allows for splicing into a circuit having a positive and a negative wire, the tube 1105 is designed to have two channels 1315, 1320. Each of the two wires 1325, 1120 are laid inside of the tube 1105, one wire in each channel. The tube 1105 is closed driving the non-conductive blade 1110 through each of the wires 1120, 1325 severing their connection between the upstream power source (upstream) and downstream powered device (downstream), and driving the conductive blades 1115 on either side of the non-conductive blade 1110 through the wire's insulation causing the conductive blades 1115 to make electrical contact with the conductor of each wire 1120, 1325 simultaneously. The tube 1105 closing will drive the conductive blades 1115 through the insulation around the respective wires 1120, 1325 in each channel 1315, 1320 until the conductive blades 1115 make contact with the conductive portions of the wires 1120, 1325. Contact being made with the wire 1120, 1325 and severing the wire 1325, 1120 will cause power to redirect through the conductive blades 1115. It is important to note that there should be a separate set of conductive blades for each wire into which the clamp is being used to splice. The separate sets of conductive blades allow for re-direction of the signals from each wire through the associated set of conductive blades without shorting out any connection. Power re-directed to the pads may be transferred from the pads on the outside of the tube to output wires 1125, 1210, 1330, 1335. This allows power to be diverted through the wire harness from the upstream side of the conductive blades to an external device (in this instance to CC). Once the MCC and clamp is connected to the power line power is processed, analyzed, manipulated etc. in the CC. Power may then be transmitted from the MCC through the clamp, through the wire harness connected to the downstream side and through the contact pad. Additionally, the MCC may provide signals via the power line by passing power/signals from the MCC through the contact pads to the conductive blades. The signals are then passed from the conductive blade to the downstream section of the wire they are making contact with. The power then passes along the wire to the device being powered, thus completing a single leg of the circuit. In the instance of a single wire clamp the process needs to be repeated for other the leg of the circuit. In the instance of a double wire clamp the process is closed due to both positive and negative wire running through the same clamp.

In embodiments, the clamp may be configured for any number of wires. For such embodiments, the clamp may comprise a number of wire channels equal to the number of wires into which the clamp is to splice. The clamp should additionally comprise a separate set of conductive blades for severing and re-directing the signal from each wire. The conductive blades should be separated such that no short circuiting of any of the wires occurs due to electrical contact between one conductive blade and multiple wires. A single non-conductive blade may be used to sever any number of wires as it is non-conductive and thus will not cause any short circuiting.

In embodiments, the conductive blades may comprise a V-shape.

Figure 6:
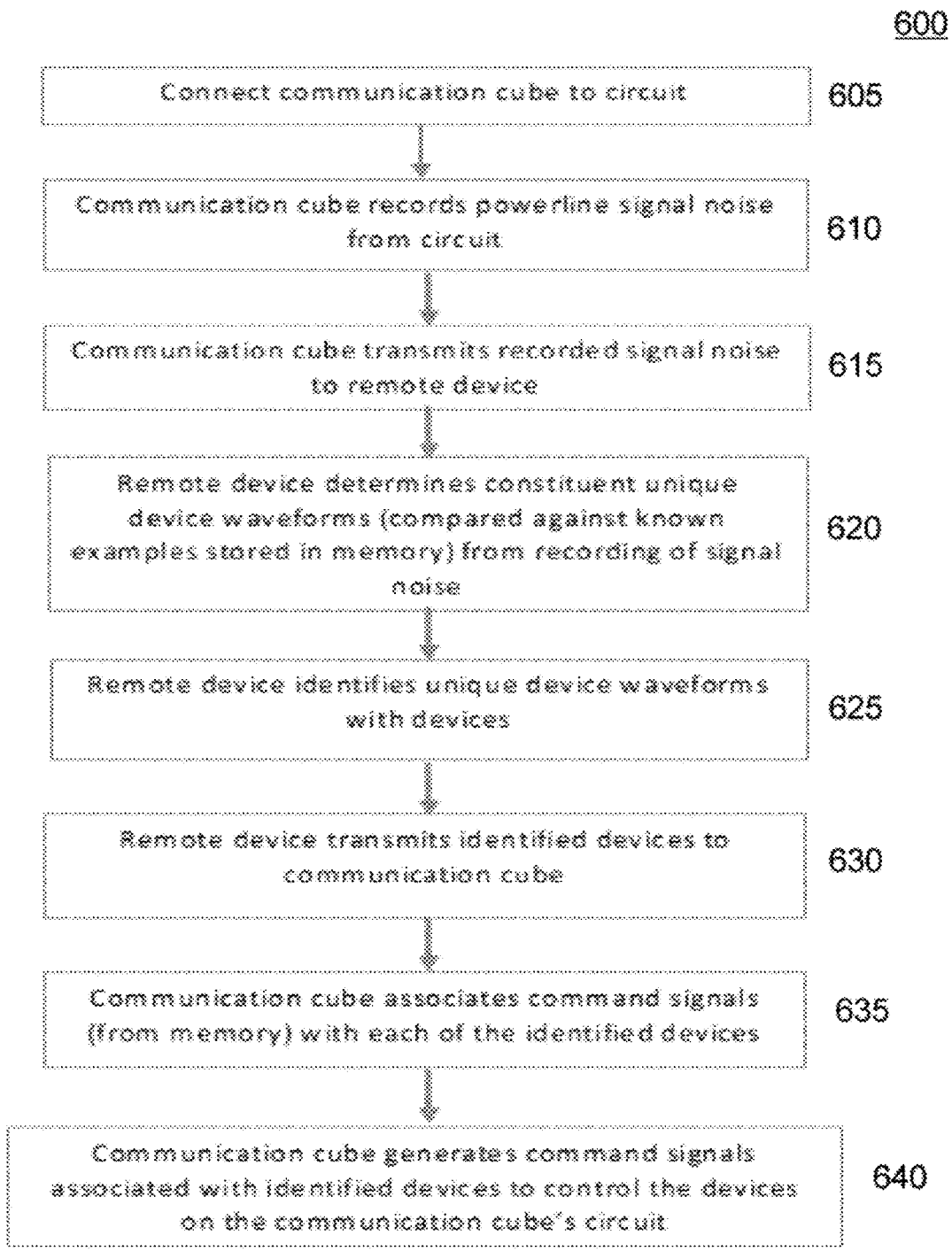
FIG. 6 illustrates a method for communicating with, identifying, monitoring and controlling electronic devices connected to a circuit, in an embodiment.

Referring to FIG. 6, in an embodiment disclosed subject matter includes method 600 for identification, communication, monitoring, and control of electronic devices connected to a circuit. Method 600 may include connecting 605 a multifunction communication cube (CC) to the circuit. It will be understood that the multifunction communication cube (CC) may have a construction, features and functionality as described elsewhere in this application. A subject circuit may be, for example, an electrical circuit of a building to provide power to electronic devices, or any other suitable circuit. The MCC may be connected to at least one conductor of the subject circuit via a clamp as described hereinabove, or may be otherwise connected or installed in conductive relationship with at least one conductor or wire of the subject circuit. Method 600 may include recording 610 signal noise from the circuit by the multifunction communication cube (CC) to provide recorded signal noise. Method 600 may include transmitting 615 the recorded signal noise to a remote device, such as a remote server, via a connection to an external communications network. It will be understood that, for example, the remote server may be accessed over the Internet. Method 600 may include determining 620 constituent unique device waveforms in the recorded signal noise, by the remote device or server, such as by a processor of the remote server comparing the recorded signal noise with samples of known unique device waveforms of known devices from a database. It will be understood that one suitable database of known devices and device waveforms may be, for example, the MIT Project Dilon signal fingerprint database. Method 600 may include identifying 625 devices connected to the subject circuit by identifying unique device waveforms of known devices that produce same from the database, by the remote server. Method 600 may include transmitting 630 identifications of devices to the communications cube (CC) from the remote server over a suitable communications network. Method 600 may include associating 635 command signals with each identified device connected to the subject circuit by a processor of the communications cube (CC). It will be understood that command signals of devices may be obtained from local memory of the communications cube (CC). Method 600 may include generating 640 command signals associated with identified devices by the processor of the communications cube (CC) on the subject circuit, to interact with and control aspects of such identified devices. It will be understood that, in an embodiment, command signals may also be communicated to identified devices over an output other than the subject circuit, such as over a wireless connection to an identified device, via a suitable wireless subsystem of the communications cube (CC). It will be understood that method 600 may be performed by any suitable system such as, for example, system 900 shown in FIG. 9.

Figure 7:
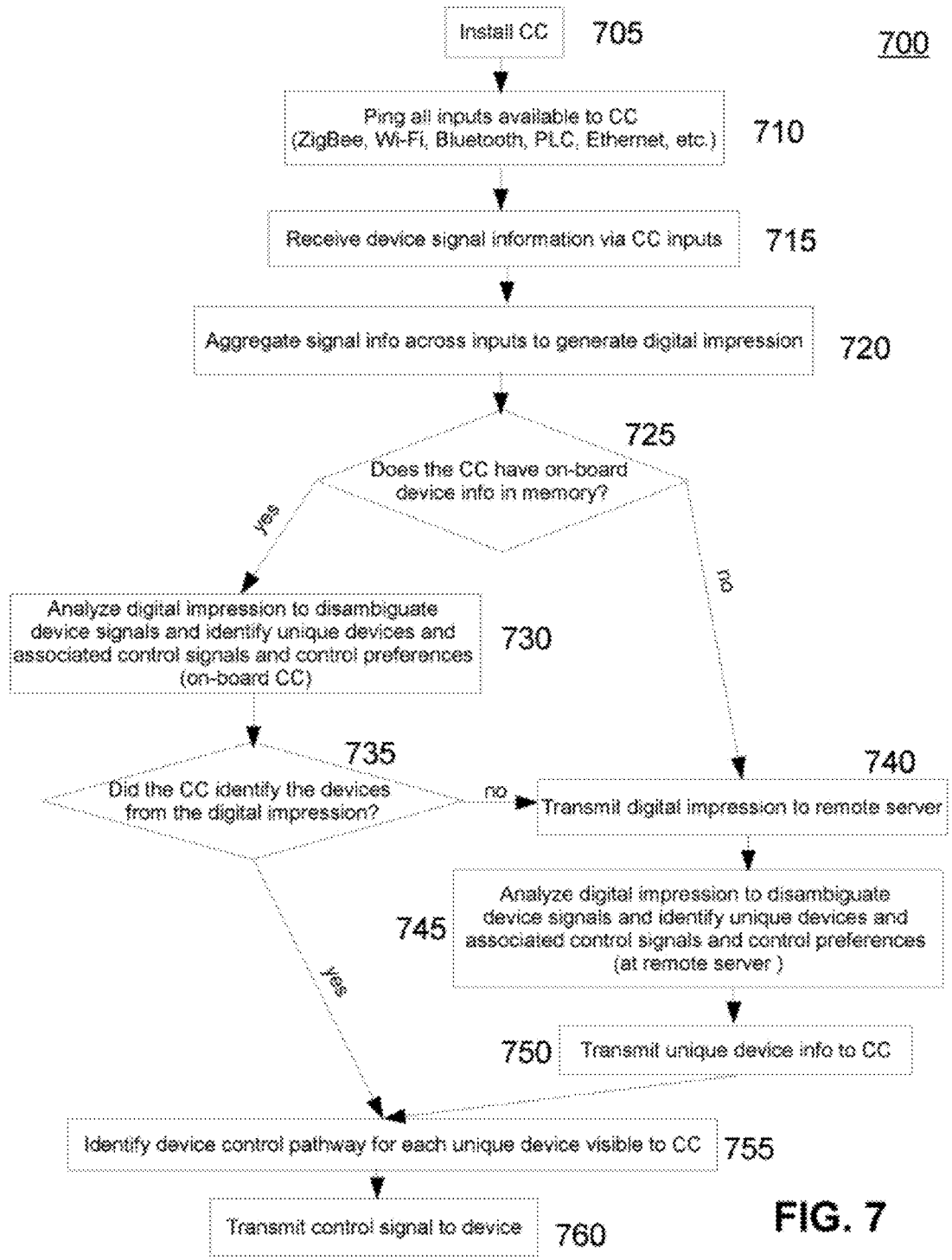
FIG. 7 illustrates a method for communicating with, identifying, monitoring and controlling electronic devices connected to a circuit, in an embodiment.

Referring to FIG. 7, in an embodiment disclosed subject matter includes method 700 for identification, communication, monitoring, and control of electronic devices at a site. Method 700 may include installing 705 a multifunction communication cube (CC) at the site. It will be understood that each multifunction communication cube (CC) may have a construction, features and functionality as described elsewhere in this application. A site may include, for example, at least one subject wired circuit, at least one subject wireless communication channel, or both, connected to at least one subject electronic device. A subject circuit may be, for example, an electrical circuit of a building to provide power to electronic devices, or any other suitable circuit such as a wired Ethernet connection of such a building. The MCC may be connected to at least one conductor of the subject circuit via a clamp as described hereinabove, or may be otherwise connected or installed in conductive relationship with at least one conductor or wire of the subject circuit. A subject wireless communication channel may be, for example, a ZigBee, Wi-Fi or Bluetooth wireless communication channel or infrastructure associated with the building or structure at the site, associated with a network at the site, or associated with subject wireless electronic devices present at the site. Method 700 may include pinging 710 over all available inputs of the MCC to respective subject circuits and subject wireless communications channels. Method 700 may include receiving 715 device signal information, signal noise, and/or conflated device signals via available inputs of the MCC from the respective subject circuits and subject wireless communications channels. Method 700 may include aggregating 720 by the MCC device signal information, signal noise and/or conflated device signals recorded from each of the inputs of the CC, to generate an aggregated digital impression or multidimensional digital impression information including recorded signal noise and recorded wireless communications information. Method 700 may include MCC disambiguation determining or analyzing 725 constituent unique device waveforms in recorded device signal information, signal noise and/or conflated device signals, by a local processor of the MCC comparing the recorded device signal information, signal noise and/or conflated device signals with samples of known unique device waveforms of known devices and/or devices previously or contemporaneously identified at the site, which are stored in MCC memory and/or stored in a local database of the MCC or any MCC in communication with the subject MCC at the site. Method 700 may include local identifying 735 of devices from the aggregated digital impression information by the CC. Method 700 may include transmitting 740 aggregated digital impression information from the MCC to a remote device, such as a remote server, via a connection to an external communications network. It will be understood that, for example, the remote server may be accessed over the Internet. Method 700 may include remote disambiguation determining or analyzing 745 aggregated digital impression or multidimensional digital impression information including recorded signal noise and recorded wireless communications information to identify constituent unique device waveforms in recorded device signal information, signal noise and/or conflated device signals, and to identify constituent device wireless communications properties or wireless constituent device identification information, by a remote processor of the remote server comparing the recorded device signal information, signal noise and/or conflated device signals with samples of known unique device waveforms of known devices and/or devices previously or contemporaneously identified at the site, and comparing recorded wireless communications information with known wireless communications information or properties of known devices or device types to identify constituent device wireless communications properties or wireless constituent device unique identification information, which are stored in memory associated with the remote server and/or stored in a remote database. It will be understood that one suitable database of known devices and device waveforms and identification information may be, for example, the MIT Project Dilon signal fingerprint database. Analyzing 745 may include identifying devices connected to a subject circuit or capable of communicating over a subject wireless communication channel or wireless infrastructure at the site, by identifying unique device waveforms of known devices that produce same, or identifying device wireless communications information or properties of known device, from the database, by the remote server. Method 700 may include transmitting 750 identifications of devices to the communications cube (CC) from the remote server over a suitable communications network. Method 700 may include associating 755 device control pathways, such as command signals, with each identified device connected to a subject circuit connected to the MCC or visible over a wireless communications connection or channel to the CC, by a processor of the communications cube (CC). It will be understood that command signals of devices may be obtained from local memory of the communications cube (CC). Method 700 may include generating or transmitting 760 command signals or control associated with identified devices by the processor of the communications cube (CC) on the subject circuit, and/or over a wireless communications connection or channel, to interact with and control aspects of such identified devices. It will be understood that, in some embodiments, command signals or control signals may be communicated to such identified devices over a wireless connection to an identified device, via a suitable wireless subsystem of the communications cube (CC). It will be understood that method 700 may be performed by any suitable system such as, for example, system 900 shown in FIG. 9.

Figure 8:
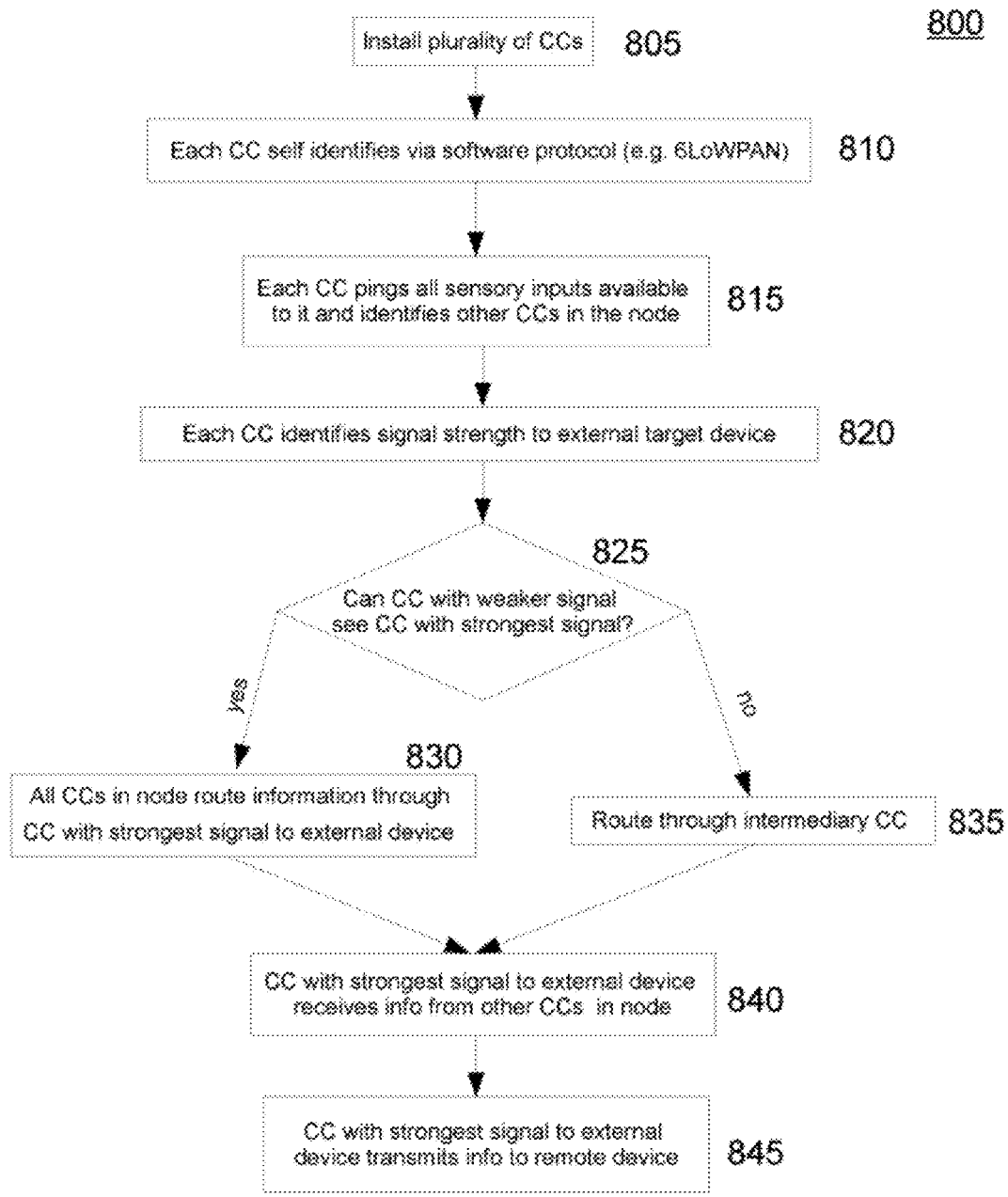
FIG. 8 illustrates a method for communicating with, identifying, monitoring and controlling electronic devices connected to a circuit, in an embodiment.

Referring to FIG. 8, in an embodiment disclosed subject matter includes method 800 for identification, communication, monitoring, and control of electronic devices at a site or node. Method 800 may include installing 805 a plurality of multifunction communication cubes (CC's) at the site or node. It will be understood that each multifunction communication cube (CC) may have a construction, features and functionality as described elsewhere in this application. A site may include, for example, at least one subject wired circuit, at least one subject wireless communication channel, or both, connected to at least one subject electronic device. Method 800 may include self-identifying 810 by each MCC via a self-identification protocol. A suitable self-identification protocol may be embodied in processor accessible code, such as software code. In an embodiment, a suitable self-identification protocol is 6LowPan. Method 800 may include pinging 815 by each MCC all sensory inputs, including available communications inputs, to identify all other CCs in the node. Method 800 may include identifying 820 by each MCC signal strength to an external target device such as, for example, a wireless network access point or wireless communications transceiver, for communication to a remote server over an external communications network such as, for example, the Internet. It will be understood that a suitable wireless communications transceiver may include a transceiver of a wireless mobile data network or cellular communications network. Method 800 may include identifying 820 signal strengths from each MCC to an external target device. Method 800 may include determining 825 whether each MCC having a relatively weaker signal strength to an external target device can see and enter into communications with another MCC having relatively strongest signal strength to an external target device. Method 800 may include direct routing 830 of information by all CCs in the node through an MCC identified as having the relatively strongest signal strength to an external target device. Method 800 may include indirect routing 835 of information by any CCs in the node to an intermediary MCC and from the intermediary MCC through an MCC identified as having the relatively strongest signal strength to an external target device. Method 800 may include receiving 840 information by an MCC identified as having the relatively strongest signal strength to an external target device, from other CCs in the node. Method 800 may include transmitting 845 information by the MCC identified as having the relatively strongest signal strength to an external target device, to said external target device. It will be understood that the particular MCC identified as having relatively strongest signal strength to an external target device may change from time to time as conditions at the site change, or as external target devices such as external wireless infrastructure changes. It will be understood that method 800 may be performed by any suitable system such as, for example, system 900 shown in FIG. 9.

Figure 9:
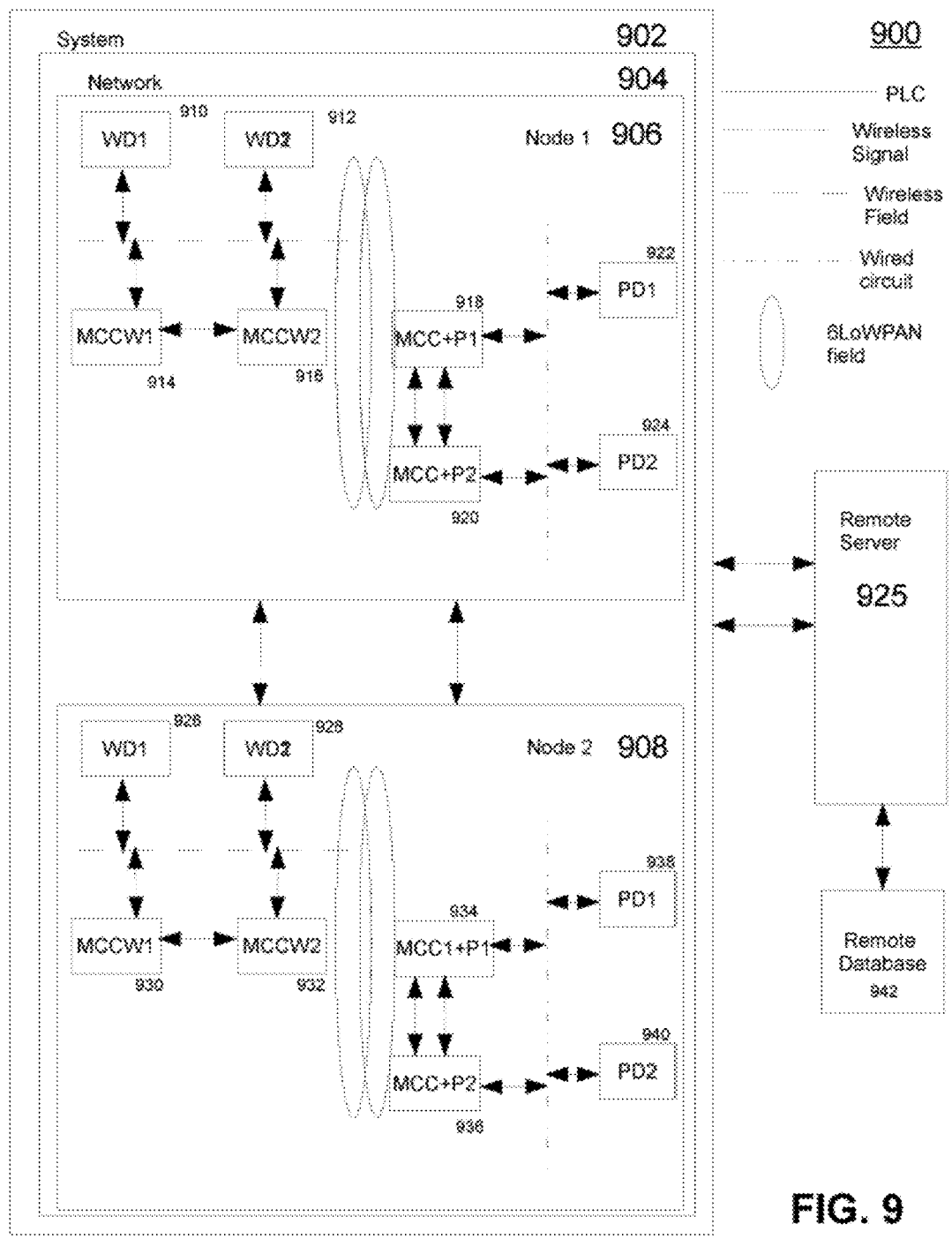
FIG. 9 illustrates a system for communicating with, identifying, monitoring and controlling electronic devices connected to a circuit, in an embodiment.

Referring to FIG. 9, in an embodiment disclosed subject matter includes system 900 for identification, communication, monitoring, and control of electronic devices at a site. System 900 may include a first node 906 and second node 908 at the site. The first node 906 and second node 908 may be identical, except that each node may be connected to different infrastructure at the site and/or each node may include different sets or groups of multifunction communication cubes (MCC's). The first node 906 is exemplary and will be described in further detail. First node 906 may include a plurality of multifunction communication cubes (MCC's) (914, 916, 918, 920) at the site. It will be understood that each multifunction communication cube (914, 916, 918, 920) may include all, or a subset, of the same or similar components, features, and functionality of apparatus 100, apparatus 200, and apparatus 300 described in detail elsewhere in this application. In the particular embodiment shown in FIG. 9, the multifunction communication cubes (MCC's) are more specifically characterized by reference to such devices including wireless communications subsystems (MCCW1, MCCW2), and other such devices including both wireless communications subsystems and wired or powerline connections (designated MCCW+P1, MCCW+P2). First node 906 may include, for example, multifunction communication cubes (MCC's designated MCCW+P1, MCCW+P2) connected to a subject wired circuit having at least one subject wired device (PD1, PD2) connected thereto. A subject circuit may be, for example, an electrical circuit of a building to provide power to electronic devices, or any other suitable circuit such as a wired Ethernet connection of such a building. As shown in FIG. 9, each MCC may be connected to at least one conductor of the subject circuit via a clamp as described elsewhere and shown in FIGS. 11-13, or may be otherwise connected or installed in conductive relationship with at least one conductor or wire of the subject circuit. First node 906 may include, for example, multifunction communication cubes (MCC's designated MCCW1, MCCW2, MCCW+P1, MCCW+P2) each connected to subject wireless communication channels and providing wireless connections to each subject wireless electronic device (WD1, WD2) within wireless reception and transmission range of such multifunction communication cubes (MCC's designated MCCW1, MCCW2, MCCW+P1, MCCW+P2). A subject wireless communication channel may be, for example, a ZigBee, Wi-Fi or Bluetooth wireless communication channel or infrastructure associated with the building or structure at the site, associated with a network at the site, or associated with subject wireless electronic devices present at the site. Each MCC may ping over all available inputs (P1, P2) of the MCC to a subject wired circuit to subject wired devices (PD1, PD2) and to subject wireless communications channels to subject wireless devices (WD1, WD2). The plurality of multifunction communication cubes (MCC's designated MCCW1, MCCW2, MCCW+P1, MCCW+P2) each may also include suitable wireless communication subsystems, such as 6LoWPAN subsystems, providing wireless communication channels and enabling wireless connections with each other multifunction communication cube (MCC's designated MCCW1, MCCW2, MCCW+P1, MCCW+P2) within wireless reception and transmission range of such multifunction communication cubes (MCC's designated MCCW1, MCCW2, MCCW+P1, MCCW+P2). Each of the multifunction communication cubes (MCC's designated MCCW1, MCCW2, MCCW+P1, MCCW+P2) may receive device signal information, signal noise, and/or conflated device signals via available inputs of the MCC from the respective subject circuits and subject wireless communications channels. Each of the multifunction communication cubes (MCC's designated MCCW1, MCCW2, MCCW+P1, MCCW+P2) may aggregate by an MCC local processor device signal information, signal noise and/or conflated device signals recorded from each of the inputs of the CC, to generate an aggregated digital impression or multidimensional digital impression information including recorded signal noise and recorded wireless communications information. Each of the multifunction communication cubes (MCC's designated MCCW1, MCCW2, MCCW+P1, MCCW+P2) may perform disambiguation determining or analyzing of constituent unique device waveforms in recorded device signal information, signal noise and/or conflated device signals, by the local processor of the MCC comparing the recorded device signal information, signal noise and/or conflated device signals with samples of known unique device waveforms of known devices and/or devices previously or contemporaneously identified at the site, which are stored in MCC memory and/or stored in a local database of the MCC or any MCC in communication with the subject MCC at the site. Each of the multifunction communication cubes (MCC's designated MCCW1, MCCW2, MCCW+P1, MCCW+P2) may perform local identifying of devices from the aggregated digital impression information by the MCC. Each of the multifunction communication cubes (MCC's designated MCCW1, MCCW2, MCCW+P1, MCCW+P2) may perform transmitting of aggregated digital impression information from the MCC to a remote device, such as a remote server 925, via a connection to an external communications network. It will be understood that, for example, the remote server 925 may be accessed over the Internet. Remote server 925 may perform remote disambiguation determining or analyzing of aggregated digital impression or multidimensional digital impression information including recorded signal noise and recorded wireless communications information to identify constituent unique device waveforms in recorded device signal information, signal noise and/or conflated device signals, and to identify constituent device wireless communications properties or wireless constituent device identification information, by a remote processor of the remote server 925 comparing the recorded device signal information, signal noise and/or conflated device signals with samples of known unique device waveforms of known devices and/or devices previously or contemporaneously identified at the site, and comparing recorded wireless communications information with known wireless communications information or properties of known devices or device types to identify constituent device wireless communications properties or wireless constituent device unique identification information, which are stored in memory (not shown) associated with the remote server and/or stored in a remote database (not shown). It will be understood that one suitable database of known devices and device waveforms and identification information may be, for example, the MIT Project Dilon signal fingerprint database. Remote server 925 may perform analyzing to identify devices connected to a subject circuit or capable of communicating over a subject wireless communication channel or wireless infrastructure at the site, by identifying unique device waveforms of known devices that produce same, or identifying device wireless communications information or properties of known devices, from the remote database. Remote server 925 may transmit identification information of devices from the remote server over a suitable communications network to the multifunction communication cubes (MCC's designated MCCW1, MCCW2, MCCW+P1, MCCW+P2). Each of the multifunction communication cubes (MCC's designated MCCW1, MCCW2, MCCW+P1, MCCW+P2) may perform associating of device control pathways, such as command signals, with each identified device connected to a subject circuit connected to a multifunction communication cube (MCC's designated MCCW1, MCCW2, MCCW+P1, MCCW+P2) or visible over a wireless communications connection or channel to a multifunction communication cubes (MCC's designated MCCW1, MCCW2, MCCW+P1, MCCW+P2), by a processor of the same. It will be understood that command signals of devices may be obtained from local memory of the multifunction communication cubes (MCC's designated MCCW1, MCCW2, MCCW+P1, MCCW+P2). Multifunction communication cubes (MCC's designated MCCW1, MCCW2, MCCW+P1, MCCW+P2) by the local MCC processor may generate or transmit command signals or control signals associated with identified devices connected to the subject circuit, and/or over a wireless communications connection or channel, to interact with and control aspects of such identified devices. It will be understood that, in some embodiments, command signals or control signals may be communicated to such identified devices over a wireless connection to an identified device, via a suitable wireless subsystem of the multifunction communication cubes (MCC's designated MCCW1, MCCW2, MCCW+P1, MCCW+P2). It will be understood that the first node 906 and second node 908 may communicate and share information regarding wired electronic devices (PD1, PD2) and wireless devices (WD1, WD2).

Figure 10:
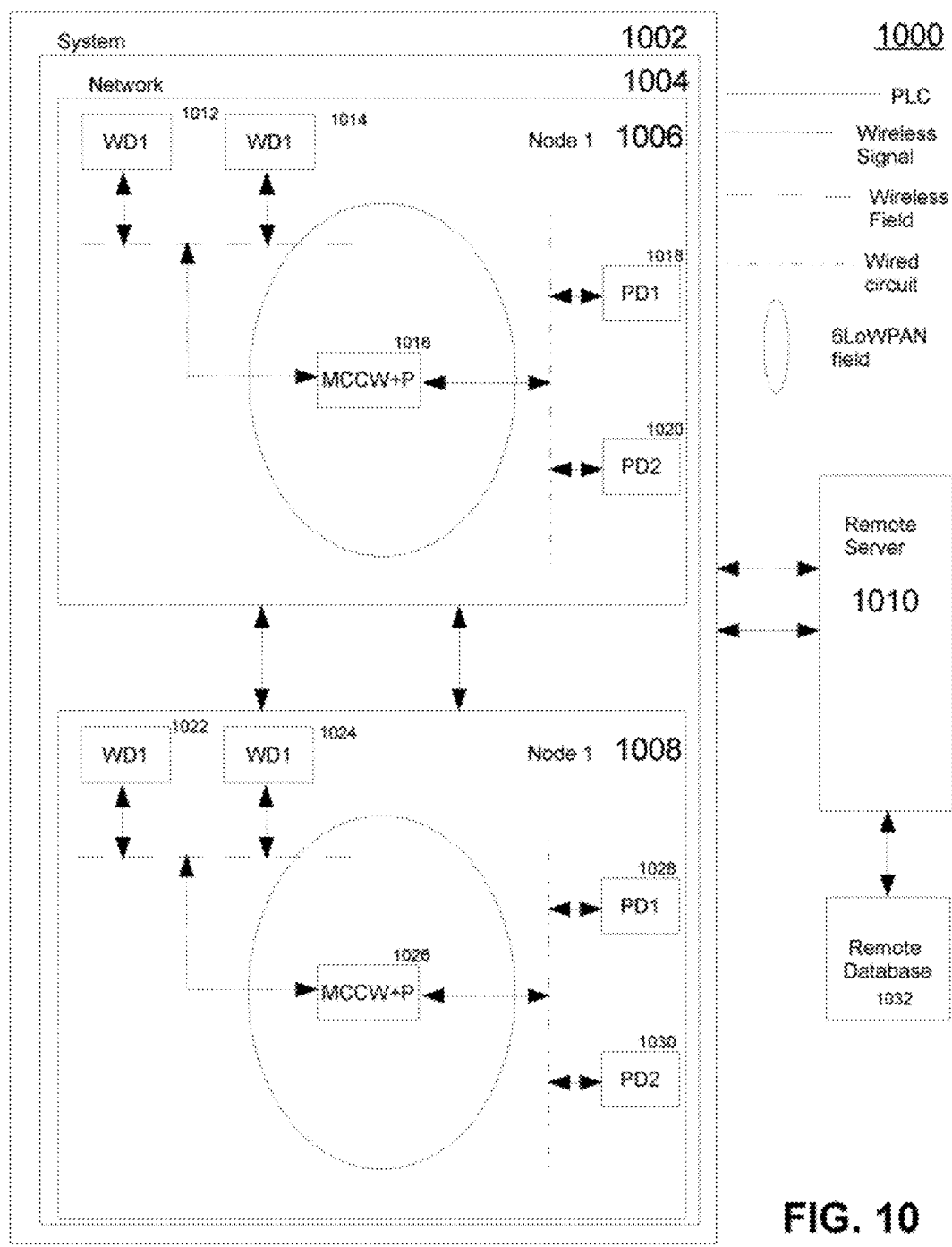
FIG. 10 illustrates a system for communicating with, identifying, monitoring and controlling electronic devices connected to a circuit, in an embodiment.

FIG. 10 illustrates a system 1000 including network 1004 having a first node 1006 and second node 1008. Each of the first node 1006 and second node 1008 include a respective single multifunction communication cube (MCC) (1016, 1026) having wireless and wired communications capabilities and subsystems. System 1000 may be otherwise identical, or substantially similar, to system 900 illustrated in FIG. 9.

Figure 14:
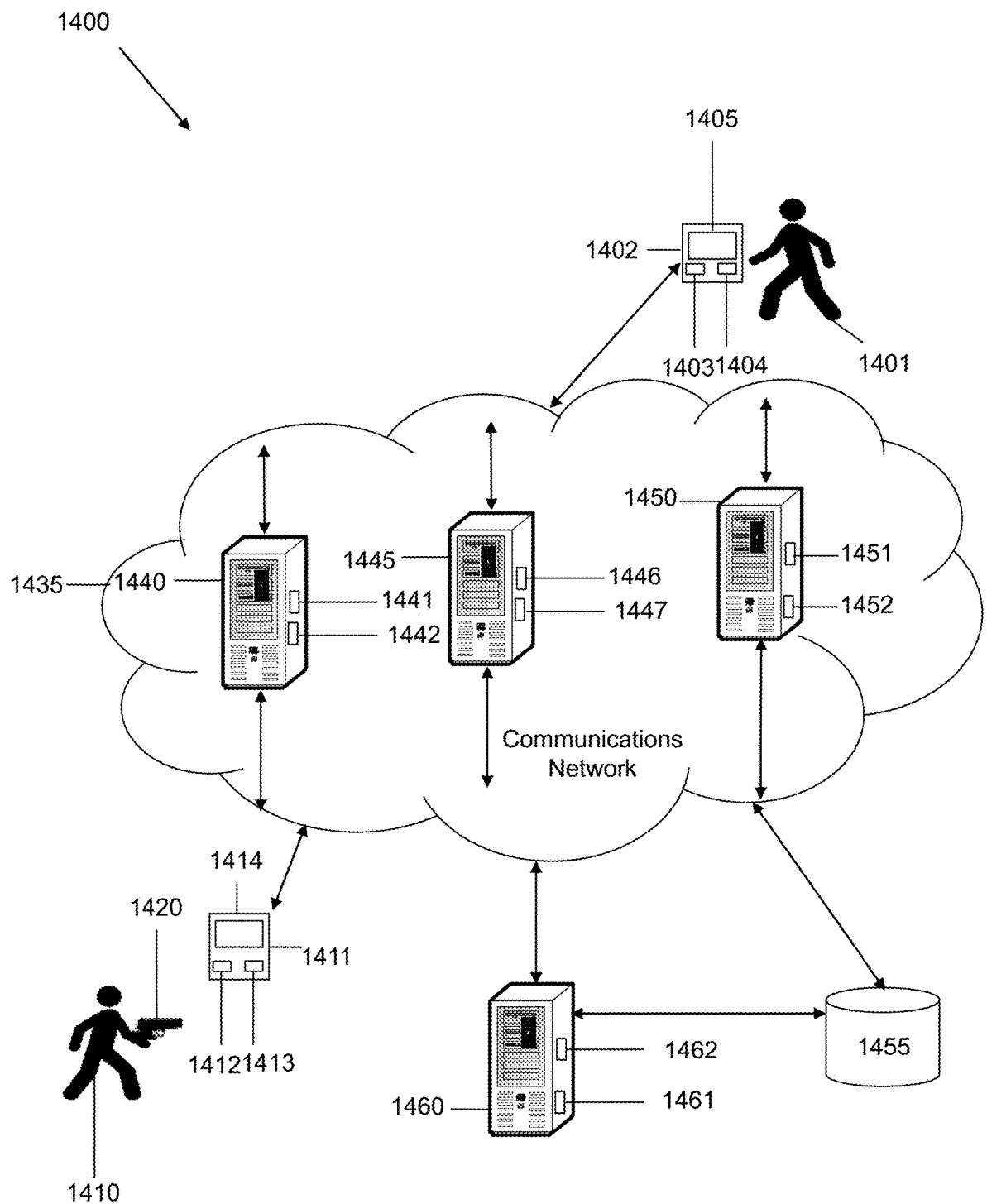
FIG. 14 is a schematic diagram illustrating a system for facilitating self-healing of a network according to an embodiment of the present disclosure.

Referring now also to FIG. 14, the systems illustrated in the previously discussed Figures may also be configured to operate with system 1400. The system 1400 may be configured to couple with the systems in any of these Figures, interact with the systems in those Figures, facilitate the operative functionality of the systems in those Figures, and/or conduct any of the functionality described in the present disclosure. Notably, the system 1400 may be configured to support, but is not limited to supporting, monitoring systems and services, data analytics systems and services, artificial intelligence services and systems, machine learning services and systems, content delivery services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, mobile applications and services, and/or any other computing applications and services. Notably, the system 1400 may include a first user 1401, who may utilize a first user device 1402 to access data, content, and services, or to perform a variety of other tasks and functions. As an example, the first user 1401 may utilize first user device 1402 to transmit signals to access various online services and content, such as those available on an internet, on other devices, and/or on various computing systems. As another example, the first user device 1402 may be utilized to access an application that provides any or all of the operative functions of the system 1400. In certain embodiments, the first user 1401 may be a bystander, any type of person, a robot, a humanoid, a program, a computer, any type of user, or a combination thereof, that may be located in a particular environment. The first user device 1402 may include a memory 1403 that includes instructions, and a processor 1404 that executes the instructions from the memory 1403 to perform the various operations that are performed by the first user device 1402. In certain embodiments, the processor 1404 may be hardware, software, or a combination thereof. The first user device 1402 may also include an interface 1405 (e.g. screen, monitor, graphical user interface, etc.) that may enable the first user 1401 to interact with various applications executing on the first user device 1402 and to interact with the system 1400. In certain embodiments, the first user device 1402 may be and/or may include a computer, any type of sensor, a laptop, a set-top-box, a tablet device, a phablet, a server, a mobile device, a smartphone, a smart watch, and/or any other type of computing device. Illustratively, the first user device 1402 is shown as a smartphone device in FIG. 14. In certain embodiments, the first user device 1402 may be utilized by the first user 1401 to control and/or provide some or all of the operative functionality of the system 1400.

In addition to using first user device 1402, the first user 1401 may also utilize and/or have access to additional user devices. As with first user device 1402, the first user 1401 may utilize the additional user devices to transmit signals to access various online services and content. The additional user devices may include memories that include instructions, and processors that execute the instructions from the memories to perform the various operations that are performed by the additional user devices. In certain embodiments, the processors of the additional user devices may be hardware, software, or a combination thereof. The additional user devices may also include interfaces that may enable the first user 1401 to interact with various applications executing on the additional user devices and to interact with the system 1400. In certain embodiments, the first user device 1402 and/or the additional user devices may be and/or may include a computer, any type of sensor, a laptop, a set-top-box, a tablet device, a phablet, a server, a mobile device, a smartphone, a smart watch, and/or any other type of computing device, and/or any combination thereof. Sensors may include, but are not limited to, motion sensors, pressure sensors, temperature sensors, light sensors, heart-rate sensors, blood pressure sensors, sweat detection sensors, breath-detection sensors, stress-detection sensors, any type of health sensor, humidity sensors, any type of sensors, or a combination thereof. The sensors for the first user device 1402 may communicate with the sensors of any of the communication cubes as disclosed in the present disclosure.

The first user device 1402 and/or additional user devices may belong to and/or form a communications network. In certain embodiments, the communications network may be a local, mesh, or other network that enables and/or facilitates various aspects of the functionality of the system 1400. In certain embodiments, the communications network may be formed between the first user device 1402 and additional user devices through the use of any type of wireless or other protocol and/or technology. For example, user devices may communicate with one another in the communications network by utilizing any protocol and/or wireless technology, satellite, fiber, or any combination thereof. Notably, the communications network may be configured to communicatively link with and/or communicate with any other network of the system 1400 and/or outside the system 1400. In certain embodiments, the first user device 1402 and/or additional user device may form a mesh network with the communication cubes described in the present disclosure In addition to the first user 1401, the system 1400 may also include a second user 1410. The second user device 1411 may be utilized by the second user 1410 (or even potentially the first user 1401) to transmit signals to request various types of content, services, and data provided by and/or accessible by communications network 1435 or any other network in the system 1400. In further embodiments, the second user 1410 may be a robot, a computer, a humanoid, an animal, any type of user, or any combination thereof. The second user device 1411 may include a memory 1412 that includes instructions, and a processor 1413 that executes the instructions from the memory 1412 to perform the various operations that are performed by the second user device 1411. In certain embodiments, the processor 1413 may be hardware, software, or a combination thereof. The second user device 1411 may also include an interface 1414 (e.g. screen, monitor, graphical user interface, etc.) that may enable the first user 1401 to interact with various applications executing on the second user device 1411 and to interact with the system 1400. In certain embodiments, the second user device 1411 may be a computer, a laptop, a set-top-box, a tablet device, a phablet, a server, a mobile device, a smartphone, a smart watch, and/or any other type of computing device. Illustratively, the second user device 1411 is shown as a mobile device in FIG. 14. In certain embodiments, the second user device 1411 may also include sensors, such as, but are not limited to, motion sensors, pressure sensors, temperature sensors, light sensors, heart-rate sensors, blood pressure sensors, sweat detection sensors, breath-detection sensors, stress-detection sensors, any type of health sensor, humidity sensors, any type of sensors, or a combination thereof.

The system 1400 may also include a communications network 1435. The communications network 1435 may be under the control of a service provider, the first user 1401, the second user 1410, any other designated user, a computer, another network, or a combination thereof. The communications network 1435 of the system 1400 may be configured to link each of the devices in the system 1400 to one another. For example, the communications network 1435 may be utilized by the first user device 1402 to connect with other devices within or outside communications network 1435. Additionally, the communications network 1435 may be configured to transmit, generate, and receive any information and data traversing the system 1400. In certain embodiments, the communications network 1435 may include any number of servers, databases, or other componentry. The communications network 1435 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 1440, 1445, and 1450 are shown as being included within communications network 1435. In certain embodiments, the communications network 1435 may be part of a single autonomous system that is located in a particular geographic region, or be part of multiple autonomous systems that span several geographic regions.

Notably, the functionality of the system 1400 may be supported and executed by using any combination of the servers 1440, 1445, 1450, and 1460. The servers 1440, 1445, and 1450 may reside in communications network 1435, however, in certain embodiments, the servers 1440, 1445, 1450 may reside outside communications network 1435. The servers 1440, 1445, and 1450 may provide and serve as a server service that performs the various operations and functions provided by the system 1400. In certain embodiments, the server 1440 may include a memory 1441 that includes instructions, and a processor 1442 that executes the instructions from the memory 1441 to perform various operations that are performed by the server 1440. The processor 1442 may be hardware, software, or a combination thereof. Similarly, the server 1445 may include a memory 1446 that includes instructions, and a processor 1447 that executes the instructions from the memory 1446 to perform the various operations that are performed by the server 145. Furthermore, the server 150 may include a memory 1451 that includes instructions, and a processor 1452 that executes the instructions from the memory 1451 to perform the various operations that are performed by the server 1450. In certain embodiments, the servers 1440, 1445, 1450, and 1460 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 14440, 1445, 1450 may be communicatively linked to the communications network 1435, any network, any device in the system 1400, or any combination thereof.

The database 1455 of the system 1400 may be utilized to store and relay information that traverses the system 1400, cache content that traverses the system 1400, store data about each of the devices in the system 1400 and perform any other typical functions of a database. In certain embodiments, the database 1455 may be connected to or reside within the communications network 1435, any other network, or a combination thereof. In certain embodiments, the database 1455 may serve as a central repository for any information associated with any of the devices and information associated with the system 1400. Furthermore, the database 1455 may include a processor and memory or be connected to a processor and memory to perform the various operation associated with the database 1455. In certain embodiments, the database 1455 may be connected to the servers 1440, 1445, 1450, 1460, the first user device 1402, the second user device 1411, the additional user devices, any devices in the system 1400, any process of the system 1400, any program of the system 1400, any other device, any network, or any combination thereof.

The database 1455 may also store information and metadata obtained from the system 1400, store metadata and other information associated with the first and second users 1401, 1410, store communications traversing the system 1400, store user preferences, store information associated with any device or signal in the system 1400, store information relating to patterns of usage relating to the user devices 1402, 1411, store any information obtained from any of the networks in the system 1400, store historical data associated with the first and second users 1401, 1410, store device characteristics, store information relating to any devices associated with the first and second users 1401, 1410, store information associated with the communications network 1435, store any information generated and/or processed by the system 1400, store any of the information disclosed for any of the operations and functions disclosed for the system 1400 herewith, store any information traversing the system 1400, or any combination thereof. Furthermore, the database 1455 may be configured to process queries sent to it by any device in the system 1400.

Notably, as shown in FIG. 14, the system 1400 may perform any of the operative functions disclosed herein by utilizing the processing capabilities of server 1460, the storage capacity of the database 1455, or any other component of the system 1400 to perform the operative functions disclosed herein. The server 1460 may include one or more processors 1462 that may be configured to process any of the various functions of the system 1400. The processors 1462 may be software, hardware, or a combination of hardware and software. Additionally, the server 1460 may also include a memory 1461, which stores instructions that the processors 1462 may execute to perform various operations of the system 1400. For example, the server 1460 may assist in processing loads handled by the various devices in the system 1400, such as, but not limited to, monitoring a state of a mesh network including any number of communication cubes; monitoring the connections between communication cubes and/or other devices in the mesh network; updating routing tables indicating connection changes of the mesh network; determining that status of each communication (and/or node) in the mesh network; determining radio signal strength to a communication cube (and/or node) from a device of interest; determining data rates associated with the mesh network; determining error rates associated with the mesh network; monitoring wired connections in addition to wireless connections of the network; selecting the best performing path via the mesh network to send data to a destination; determining alternate routes within the mesh network in the event a cube and/or node fails in the mesh network; performing monitoring at selected time intervals; probing connections that each communication cube locates; building a network of connections based on MAC addresses associated with the connections; testing the speed of detected connections; testing the data rate of the mesh network; determining an accuracy of data transmitted; building tables with data on detected cubes and/or nodes; transmitting the table and/or information to a subset or all of the mesh network; building a routing table that prioritizes the fastest data for the best path to each node/cube; and performing any other suitable operations conducted in the system 100 or otherwise. In one embodiment, multiple servers 1460 may be utilized to process the functions of the system 1400. The server 1460 and other devices in the system 100, may utilize the database 1455 for storing data about the devices in the system 1400 or any other information that is associated with the system 1400. In one embodiment, multiple databases 1455 may be utilized to store data in the system 1400.

Figure 18:
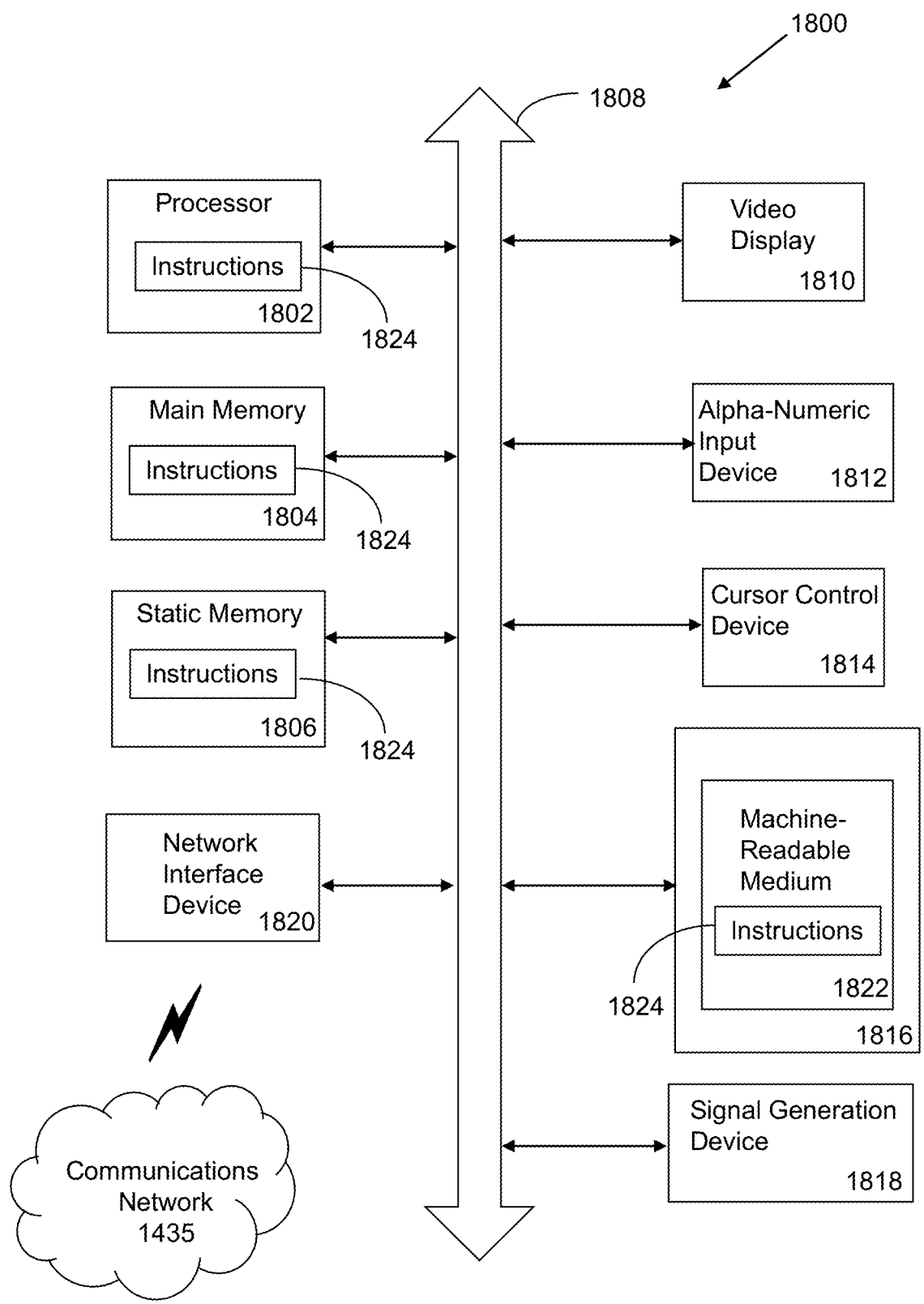
FIG. 18 is a schematic diagram of a machine in the form of a computer system within which a set of instructions, when executed, may cause the machine to facilitate self-healing of a network.

Although FIGS. 14, 15, and 18 illustrates specific example configurations of the various components of the system 1400, the system 1400 may include any configuration of the components, which may include using a greater or lesser number of the components. For example, the system 1400 is illustratively shown as including a first user device 1402, a second user device 1411, a communications network 1435, a server 1440, a server 1445, a server 1450, a server 1460, and a database 1455. However, the system 1400 may include multiple first user devices 1402, multiple second user devices 1411, multiple communications networks 1435, multiple servers 1440, multiple servers 1445, multiple servers 1450, multiple servers 1460, multiple databases 1455, or any number of any of the other components inside or outside the system 1400. Furthermore, in certain embodiments, substantial portions of the functionality and operations of the system 1400 may be performed by other networks and systems that may be connected to system 1400.

Notably, the system 1400 may execute and/or conduct the functionality as described in the method(s) disclosed herein above. For instance, the methods for routing data through a network and for facilitating self-healing of the network discussed herein above (e.g., in connection with FIGS. 15-17) may be conducted via an application of the system 1400, devices of the system 1400, processes of the system 1400, any component of the system 1400, or a combination thereof. At step 1502, the method 1500 may include Notably, the method 1500 may further incorporate any of the features and functionality described for the system 1400, any other system, any other method disclosed herein, or as otherwise described herein.

Referring now also to FIG. 18, at least a portion of the methodologies and techniques described with respect to the exemplary embodiments of the system 1800 can incorporate a machine, such as, but not limited to, computer system 1800, or other computing device within which a set of instructions, when executed, may cause the machine to perform any one or more of the methodologies or functions discussed above. The machine may be configured to facilitate various operations conducted by the system 1400. For example, the machine may be configured to, but is not limited to, assist the system 1400 by providing processing power to assist with processing loads experienced in the system 1400, by providing storage capacity for storing instructions or data traversing the system 1400, or by assisting with any other operations conducted by or within the system 1400. As another example, the computer system 1800 may assist with monitoring a mesh network of the system and/or communication cubes of the system.

In some embodiments, the machine may operate as a standalone device. In some embodiments, the machine may be connected (e.g., using communications network 1435, another network, or a combination thereof) to and assist with operations performed by other machines and systems, such as, but not limited to, the first user device 1402, the second user device 1411, the server 1440, the server 1445, the server 1450, the database 1455, the server 1460, any other system, program, and/or device, or any combination thereof. The machine may be connected with any component in the system 1400. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1800 may include a processor 1802 (e.g., a central processing unit (CPU), a graphics processing unit (GPU, or both), a main memory 1804 and a static memory 1806, which communicate with each other via a bus 1808. The computer system 1800 may further include a video display unit 1810, which may be, but is not limited to, a liquid crystal display (LCD), a flat panel, a solid state display, or a cathode ray tube (CRT). The computer system 1800 may include an input device 1812, such as, but not limited to, a keyboard, a cursor control device 1814, such as, but not limited to, a mouse, a disk drive unit 1816, a signal generation device 1818, such as, but not limited to, a speaker or remote control, and a network interface device 1820.

The disk drive unit 1816 may include a machine-readable medium 1822 on which is stored one or more sets of instructions 1824, such as, but not limited to, software embodying any one or more of the methodologies or functions described herein, including those methods illustrated above. The instructions 1824 may also reside, completely or at least partially, within the main memory 1804, the static memory 1806, or within the processor 1802, or a combination thereof, during execution thereof by the computer system 1800. The main memory 1804 and the processor 1802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1822 containing instructions 1824 so that a device connected to the communications network 1435, another network, or a combination thereof, can send or receive voice, video or data, and communicate over the communications network 1435, another network, or a combination thereof, using the instructions. The instructions 1824 may further be transmitted or received over the communications network 1435, another network, or a combination thereof, via the network interface device 1820.

While the machine-readable medium 1822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

I claim:

1. A node of a communication network comprising:
   a transmitter;
   a receiver; and
   a memory that stores instructions; and
   a processor that executes the instructions to perform operations, the operations comprising:
   a. monitoring a mesh network comprising a node and a plurality of other nodes to detect each communication link that the node has with another node of the mesh network;
   b. for each detected communication link with another node, determining at least one performance parameter for the detected communication link;
   c. ranking the communication links as a function of the at least one performance parameter;
   d. receiving data, the data indicating a destination node for the data;
   e. selecting one of the communication links for transmitting the received data toward the destination node based on the ranking;
   f. determining whether the selected communication link is operable;
   g. if the selected communication link is operable, transmitting the data via the selected communication link; and
   h. if the selected link is not operable, updating the ranking and transmitting the data via a different communication link;
   wherein updating the ranking comprises reducing the rank of the inoperable communication link and wherein the transmitting the data via a different communication link comprises:
   repeating operations (e) through (h) until an operable link is selected and the data is transmitted via that link.

2. The system of claim 1 wherein the selecting a communication link comprises selecting the highest ranked communication link subject to any other criterion for forwarding the received data toward the destination node.

3. The system of claim 1 wherein the ranking of the communication links is maintained in a table and wherein updating the ranking comprises removing the inoperable communication link from the table.

4. The system of claim 1 wherein the plurality of communication links comprises communication links of different communication modes.

5. The system of claim 4 wherein the different communication modes comprise at least any two of:
   Wi-Fi;
   Ethernet;
   Digi 900 Mhz wireless communication;
   power line communication link; and
   Bluetooth.

6. The system of claim 4 wherein the at least one performance parameter comprises at least one of:
   an accuracy of data transmission over the communication link;
   a signal strength of the communication link;
   a data rate of the communication link; or
   a bit error rate of the communication link.

7. The system of claim 4 wherein each detected communication link comprises a node to which the link leads and a communication mode of the link.

8. The system of claim 7 wherein the communication links are identified by their MAC addresses in the ranking.

9. The system of claim 1 wherein the operations further comprise: redetermining the at least one parameter of the communication links occasionally and updating the ranking accordingly.

10. The system of claim 9 wherein the operations further comprise:
    configuring testing periods for determining the at least one parameter of the communication links; and determining the at least one parameter during the testing periods.

11. The system of claim 9 wherein the operations further comprise:
selecting the at least one performance parameter.

* * * * *